(12) United States Patent
Kato et al.

(10) Patent No.: US 8,953,304 B2
(45) Date of Patent: Feb. 10, 2015

(54) SOLID ELECTROLYTIC CAPACITOR

(75) Inventors: Kazufumi Kato, Tokyo (JP); Rumina Obi, Tokyo (JP); Ikuo Ueno, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 175 days.

(21) Appl. No.: 13/391,122

(22) PCT Filed: Aug. 19, 2010

(86) PCT No.: PCT/JP2010/064018
§ 371 (c)(1),
(2), (4) Date: Feb. 17, 2012

(87) PCT Pub. No.: WO2011/021668
PCT Pub. Date: Feb. 24, 2011

(65) Prior Publication Data
US 2012/0154985 A1    Jun. 21, 2012

(30) Foreign Application Priority Data
Aug. 19, 2009    (JP) .................................. 2009-190095

(51) Int. Cl.
*H01G 9/00* (2006.01)
*H01G 9/02* (2006.01)
(Continued)

(52) U.S. Cl.
CPC . *H01G 9/151* (2013.01); *H01G 9/02* (2013.01)
USPC ............................. 361/523; 361/512; 361/530

(58) Field of Classification Search
CPC ....................................................... H01G 9/02
USPC ......................................... 361/523, 512, 530
See application file for complete search history.

(56) References Cited

U.S. PATENT DOCUMENTS

| 6,208,503 | B1 | 3/2001 | Shimada et al. |
| 6,519,137 | B1 | 2/2003 | Nitta et al. |

(Continued)

FOREIGN PATENT DOCUMENTS

| EP | 1 024 509 A1 | 8/2000 |
| EP | 1 637 317 A1 | 3/2006 |

(Continued)

OTHER PUBLICATIONS

Japanese Patent Office, Decision of Final Rejection, Jun. 11, 2013, issued in corresponding Japanese Patent Application No. JP 2011-527704.

(Continued)

*Primary Examiner* — Eric Thomas
*Assistant Examiner* — Arun Ramaswamy
(74) *Attorney, Agent, or Firm* — Finnegan, Henderson, Farabow, Garrett & Dunner, L.L.P.

(57) ABSTRACT

There is provided a high performance solid electrolytic capacitor that can be manufactured stably. The present invention provides the solid electrolytic capacitor comprising an anode foil and a cathode foil, and a separator arranged between the anode foil and the cathode foil, wherein the anode foil, the cathode foil, and the separator are wound around, so that the separator is intervened between the anode foil and the cathode foil, the anode foil has a dielectric oxide film layer, the separator comprises a solid electrolyte and a nonwoven fabric holding the solid electrolyte, the nonwoven fabric composing the separator is a laminated nonwoven fabric having at least two layers of the nonwoven fabric layers, and the laminated nonwoven fabric comprises a nonwoven fabric layer (layer I) composed of ultra fine fiber having a fiber diameter of 0.1 to 4 μm, and a nonwoven fabric layer (layer II) composed of a thermoplastic resin fiber having a fiber diameter of 6 to 30 μm.

12 Claims, 1 Drawing Sheet

(51) Int. Cl.
  *H01G 4/32* (2006.01)
  *H01G 9/04* (2006.01)
  *H01G 9/15* (2006.01)

(56) References Cited

U.S. PATENT DOCUMENTS

| | | | |
|---|---|---|---|
| 2002/0045091 A1 | 4/2002 | Kamei et al. | |
| 2006/0292954 A1 | 12/2006 | Suzuka et al. | |

FOREIGN PATENT DOCUMENTS

| | | | |
|---|---|---|---|
| JP | 11-283602 | | 10/1999 |
| JP | 11283602 A | * | 10/1999 |
| JP | 3399515 | | 3/2000 |
| JP | 2001-60535 | | 3/2001 |
| JP | 2001-1892424 | | 7/2001 |
| JP | 2002050335 | | 2/2002 |
| JP | 2002-170540 | | 6/2002 |
| JP | 3319501 | | 6/2002 |
| JP | 2002170540 A | * | 6/2002 |
| JP | 2003-059767 | | 2/2003 |
| JP | 3606137 | | 10/2004 |
| JP | 2005-44587 | | 2/2005 |
| JP | 2005044587 A | * | 2/2005 |
| JP | 2005-109053 A | | 4/2005 |
| JP | 2006-41223 | | 2/2006 |
| JP | 3965871 | | 6/2007 |
| JP | 4013460 | | 9/2007 |
| WO | WO 2004/094136 | | 11/2004 |

OTHER PUBLICATIONS

Taiwanese Patent and Trademark Office, Office Action, May 29, 2013, issued in corresponding Taiwanese Patent Application No. 099127798.

Chinese Patent Office, "Notice of Reasons for Rejection," Feb. 5, 2013, issued in corresponding Chinese patent application, 7 pages.

Japanese Patent Office, Office Action, Feb. 12, 2013, issued in corresponding Japanese patent application No. JP 2011-527704, 3 pages.

English-language International Search Report from the Japanese Patent Office mailed Nov. 16, 2010, for International Application No. PCT/JP2010/064018.

Supplementary European Search Report for EP Application No. 10 81 0009 dated Oct. 24, 2014.

* cited by examiner

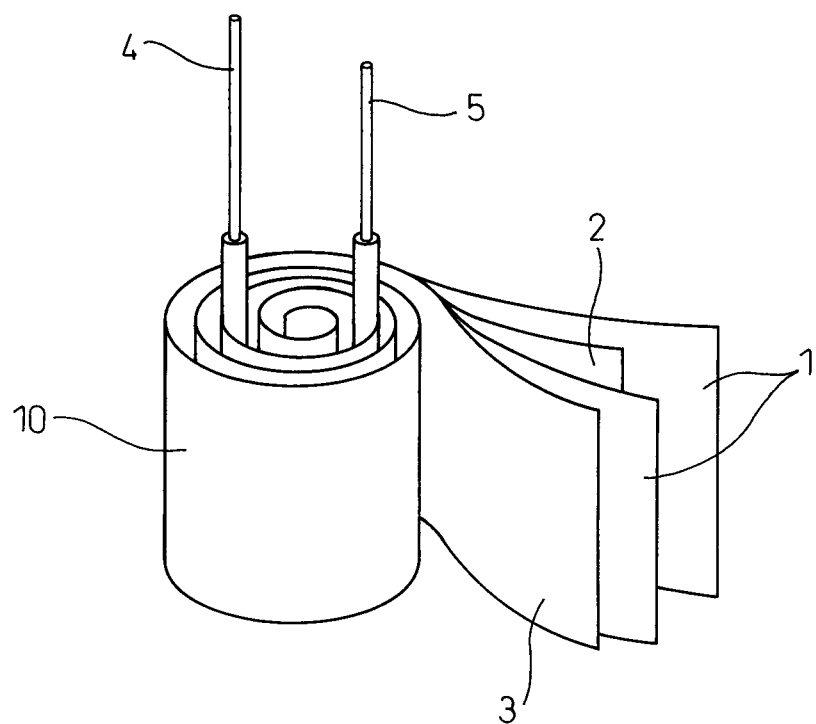

SOLID ELECTROLYTIC CAPACITOR

BACKGROUND OF THE INVENTION

1. Technical Field

The present invention relates to a solid electrolytic capacitor, wherein a laminated nonwoven fabric is used to form a separator.

2. Background Art

To enhance reliability and performance of electronic equipment, an electrolytic capacitor has been required that has longer life time and higher than normal electric characteristics compared with a conventional capacitor. For example, a capacitor that has excellent impedance characteristics in a high frequency region for electronic equipment has been required. Therefore, a solid electrolytic capacitor having low impedance in a high frequency region, using a solid electrolyte or a tetracyanoquinodimethane complex salt or the like having high electrical conduction, has been used. In addition, solid electrolytic capacitor is an electrical component having long life time and high reliability since an electrolytic solution is not used. Accordingly, applications of a solid electrolytic capacitor have been expanded because of capability of enhancing safety of electric appliances. On the other hand, as a solid electrolytic capacitor, a capacitor referred to as a winding type has been used in response to requirements for higher capacitance thereof. This winding type capacitor is typically formed by the following method. A cathode foil, an anode foil, and a separator are wound around, so that the separator is intervened between the cathode foil and the anode foil. After that, liquid such as a monomer (a monomer, a tetracyanoquinodimethane complex salt or the like, having high electrical conduction), an aqueous solution dispersed with fine particles of an electric conductive polymer, and an aqueous solution of the electric conductive polymer, is impregnated as a material of the electric conductive polymer, into this wound substance. Thus, a solid electrolyte layer is formed between electrodes by polymerization or binding of this electric conductive polymer material. The solid electrolytic capacitor formed in this way can be used as a capacitor element utilizing electrical conduction property. Conventionally, a separator which has been used in solid electrolytic capacitors has been a separator mainly composed of a cellulose component such as pulp or Manila hemp, as in an electrolytic solution-type capacitor.

However, the conventional separator has problems to be solved. That is, when a large quantity of a volatile substance, such as moisture, is contained inside the electronics parts that are supplied for surface mounting, the inside volatile substance evaporates all at once by heat, in the surface mounting step such as reflow soldering, which fractures parts and has thus increased fraction defective. Cellulose, which is a main component of pulp or Manila hemp composing the separator, contains a large quantity of moisture even in a usual state, and still more absorbed a large quantity of moisture or the like in the manufacturing step of a capacitor. That is, moisture entrained from the separator mainly composed of cellulose was a cause to increase fraction defective. Accordingly, to solve this demerit, in the conventional separator mainly composed of pulp, Manila hemp or the like, a capacitor component has been finished so as to reduce moisture content in the capacitor element, by a method of making a drying step excessive, to evaporate moisture or the like contained in cellulose such as pulp, or a method of carbonizing a cellulose component, in the manufacturing step of the capacitor. These methods required large scale equipment and thus a large quantity of energy in the steps, resulting in increase of cost of the solid electrolytic capacitor.

Still more, the above problems led to performance deterioration of a capacitor element itself. One of factors largely influencing performance of the solid electrolytic capacitor relates to necessity to form a dielectric oxide film layer as an anode (for example, in a solid aluminum electrolytic capacitor, an aluminum oxide layer) so as to attain a continuous layer and uniform thickness, at the whole surface of a metal foil having valve action, made of aluminum or the like. In the conventional separator, damage (damage by deterioration by heat, or contamination of the oxide film layer by gas components coming out from cellulose) generated in this oxide film layer in a heating step for evaporating moisture or the like, or a step of carbonizing cellulose or the like, resulting in deterioration of capacitor performance. For example, withstand voltage could not increase, or ripple current characteristics was poor, in the capacitor element. That is, in the solid electrolytic capacitor requiring high performance, because of necessity to adopt a heating step for this separator, performance of the capacitor cannot be enhanced and thus withstand voltage has been suppressed low. The solid electrolytic capacitor had a merit of longer life time as compared with an electrolytic solution-based capacitor, because of no worry of decrease in life time caused by leakage of an electrolytic solution, owing to no use of the electrolytic solution and thus small vaporization or leakage of an electrolyte. Irrespective of this merit, application range of the solid electrolytic capacitor is limited, because high withstand voltage similarly as an electrolytic solution capacitor was unattainable. Additionally, the solid electrolytic capacitor still had similar problems as in the electrolytic solution capacitor, that is, a problem that high capacitance of a capacitor was unattainable, and a problem that compact sizing of parts was unfeasible.

To solve these problems, various methods have been considered (refer to the PATENT LITERATURES 1 to 6). For example, in the PATENT LITERATURES 1 to 4, there has been described a separator having moisture suppressed, by using a PET or PET-type nonwoven fabric, as the separator.

In addition, in the PATENT LITERATURES 5 and 6, there has been attempted to form a uniform solid electrolyte layer using a nonwoven fabric made of vinylon fiber and/or a blend of vinylon fiber and synthetic fiber, aiming at the similar object as above. In addition, in a blended nonwoven fabric using vinylon fiber or the like, a binder is used in forming the nonwoven fabric. The binder is used for preventing a wound substance from not being produced stable, due to unraveling of fibers or extension of the nonwoven fabric in the winding step, when the separator is slit thinly.

As the other method, there has been attempted to use a woven fabric or a nonwoven fabric, using a glass fiber, as the separator.

In addition, as the other method, in the PATENT LITERATURE 8, there has been attempted to use a nonwoven fabric composed of a crystalline polymer (typically made by a melt blown method), as the separator.

PRIOR ART LITERATURES

Patent Literature

PATENT LITERATURE 1: JP No. 4013460
PATENT LITERATURE 2: JP No. 3606137
PATENT LITERATURE 3: JP-A-2001-60535
PATENT LITERATURE 4: JP No. 3965871
PATENT LITERATURE 5: JP No. 3319501
PATENT LITERATURE 6: JP No. 3399515

PATENT LITERATURE 7: WO 2004-094136
PATENT LITERATURE 8: JP-A-2006-41223

SUMMARY OF INVENTION

Problem to be Solved by the Invention

However, the nonwoven fabric obtained by a spunbond method or a wet-type method described in above PATENT LITERATURES 1 to 4 has large diameter of fiber composing the nonwoven fabric. Therefore, although a separator in which the moisture was removed was used, a capacitor element having original high performance has not been obtained and practically applied.

Reason for not being attained practical application of the above PET or PET-type nonwoven fabric, such as those described in the PATENT LITERATURES 1 to 4, is that diameter of fiber composing these is generally as large as ten and several micron, in the nonwoven fabric obtained by the spunbond method, the wet-type method and a dry-type method. Therefore the nonwoven fabric itself is rough, inter-fiber distance is large and weight is largely varied as well (in a winding type, slit width of a separator is usually several mm to 10 mm). That is, in forming a solid electrolytic capacitor, it is difficult for liquid to become a material of an electric conductive polymer, such as a monomer or the like for forming the solid electrolyte, to penetrate into space of fibers themselves. Accordingly, caused by surface tension of a monomer or the like and interface tension between materials, distribution of the monomer or the like for forming the solid electrolyte layer will not be uniform, which inhibited formation of the fine and uniform solid electrolyte layer. A dielectric oxide film layer which will be a cathode, and the solid electrolyte layer should contact uniformly at least at a predetermined part. However, a non-uniform solid electrolyte layer decreased a contact area of these layers and lowered capacitor capacitance. In addition, in view of a separator width of a winding type capacitor, a nonwoven fabric using a conventional thermoplastic resin provided too large variation of weight and thickness, as well as large variation in thickness and uniformity of the solid electrolyte layer. That is, one of the important requisites controlling performance of the solid electrolytic capacitor is that the solid electrolyte layer which will be a substantial cathode is prepared more uniformly. However, conventionally, the uniform solid electrolyte layer has not been attained because of large inter-fiber distance of the nonwoven fabric composing the separator.

In addition, methods described in above PATENT LITERATURES 5 to 6 require a step for removing a binder, thus they needlessly increase the step, irrespective of a use of the synthetic fiber. In addition, since water or the like is used to remove the binder, it was necessary to remove this water or the like. These have deteriorated performance of a capacitor element. In addition, the binder gave adverse influence on formation of a good metal-oxide layer, thus causing no enhancement of withstand voltage or the like, or gave adverse influence on capacitor performance such as capacitance and internal resistance or the like, because of adverse influence on formation of the solid electrolyte layer.

In addition, also in the nonwoven fabric made of vinylon fiber and/or a blend of vinylon fiber and the synthetic fiber like those described in above PATENT LITERATURES 5 and 6, fiber diameter is substantially large. Therefore, an electrolyte cannot impregnate uniformly and finely in spaces between fibers, and thus was not able to form the good solid electrolyte layer.

Further, even in technology in which a cloth of glass fiber is used, inter-fiber distance has not been taken into consideration. In addition, in technology using glass fiber, there was a problem of increase in fraction defective, because a glass fiber is a fragile material to cause fracture by folding or twisting during processing. Therefore, a product using this has not been substantially realized.

On the other hand, in the nonwoven fabric described in PATENT LITERATURE 8, because of small fiber diameter (about several µm), inter-fiber distance is also small and opening size is also small. However, a melt blown nonwoven fabric has weak strength at break and elongates by small force. The reason for that is low crystallinity of a fiber-forming resin, or insufficient fiber stretching. Accordingly, even by technology described in PATENT LITERATURE 8, practical application has not been attained, because of high fraction defective in the winding step in forming a capacitor. In addition, in nonwoven fabric as described in PATENT LITERATURE 8, because of low crystallinity of a resin, the relevant nonwoven fabric was weak against surface friction and wear, easily generated extraneous substances such as fluff or pilling at the surface in the processing step, while, under condition of strong pressure bonding so as to endure friction and wear, inter-fiber becomes too close, resulting in generation of a portion where liquid to be a material of an electric conductive polymer such as a monomer did not penetrate sufficiently inside the separator, which was not able to form the uniform solid electrolyte layer. Nonwoven fabric obtained by a melt blown method as described in PATENT LITERATURE 8 was not able to attain the above object of forming the solid electrolyte and the dielectric oxide layer finely and uniformly in the solid electrolytic capacitor, because of the above reason. On the other hand, in PATENT LITERATURE 7, a separator for a solid capacitor has not been disclosed.

In view of the above problems, an object of the present invention is to provide a high performance solid electrolytic capacitor which can be stably manufactured.

Means for Solving the Problem

The present inventors have intensively studied a way to solve the above-described problems and discovered, as a result, that, by using a laminated nonwoven fabric having two or more different layers having specific fiber diameters, as a separator, the solid electrolytic capacitor having higher performance (specifically, high withstand voltage, high capacitance and low ESR: Equivalent Series Resistance) can be obtained, and have completed the present invention. That is, the present invention covers the following aspects.

[1] A solid electrolytic capacitor comprising a anode foil, a cathode foil, and a separator arranged between the anode foil and the cathode foil, wherein
the anode foil, the cathode foil, and the separator are wound with the separator between the anode foil and the cathode foil;
the anode foil having a dielectric oxide film layer,
the separator comprising a solid electrolyte and a nonwoven fabric holding the solid electrolyte,
the nonwoven fabric forming the separator is a laminated nonwoven fabric having at least two layers of nonwoven fabric layers, and
the laminated nonwoven fabric comprising a nonwoven fabric layer (layer I) composed of ultra fine fiber having a fiber diameter of 0.1 to 4 µm, and a nonwoven fabric layer (layer II) composed of thermoplastic resin fiber having a fiber diameter of 6 to 30 µm.

[2] The solid electrolytic capacitor according to the above [1], wherein
the laminated nonwoven fabric consisting of two nonwoven fabric layers (layer II) with an intermediate ultra fine fiber layer (layer I) therebetween,
a fiber diameter of the ultra fine fiber in the nonwoven fabric layer (layer I) is 0.1 to 4 μm, and
a fiber diameter of the thermoplastic resin fiber in the nonwoven fabric layer (layer II) is 6 to 30 μm.

[3] The solid electrolytic capacitor according to the above [1] or [2], wherein the thermoplastic resin fiber in the nonwoven fabric layer (layer II) is a thermoplastic synthetic filament.

[4] The solid electrolytic capacitor according to any one of the above [1] to [3], wherein the laminated nonwoven fabric is formed by integration by thermal bonding.

[5] The solid electrolytic capacitor according to any one of the above [1] to [4], wherein the thermoplastic resin fiber in the nonwoven fabric layer (layer II) is fiber of a crystalline resin having a melting point of 180° C. or higher.

[6] The solid electrolytic capacitor according to any one of the above [1] to [5], wherein the laminated nonwoven fabric has a thickness of 10 to 80 μm, and a weight of 7 to 50 g/m².

[7] The solid electrolytic capacitor according to any one of the above [1] to [6], wherein the nonwoven fabric layer (layer I) is formed by a melt blown method.

[8] The solid electrolytic capacitor according to any one of the above [1] to [7], wherein ratio of weight (i) of the nonwoven fabric layer (layer I) to weight (ii) of the nonwoven fabric layer (layer II) in the laminated nonwoven fabric, (i)/(ii), is 1/10 to 2/1.

[9] The solid electrolytic capacitor according to any one of the above [1] to [8], wherein the laminated nonwoven fabric has been subjected to calendering.

[10] The solid electrolytic capacitor according to any one of the above [1] to [9], wherein the laminated nonwoven fabric has been subjected to hydrophilization processing.

Effect of the Invention

In the solid electrolytic capacitor of the present invention, the specific laminated nonwoven fabric is used as the separator. Therefore, the solid electrolytic capacitor of the present invention can be manufactured by a stable manufacturing step, and can be manufactured at low cost because of a good yield. In addition, the solid electrolytic capacitor of the present invention exhibits high performance, since it has high withstand voltage, high capacitance and low ESR.

BRIEF DESCRIPTION OF THE DRAWINGS

FIG. 1 is a schematic drawing of a solid electrolytic capacitor of the present invention.

EMBODIMENT FOR CARRYING OUT THE INVENTION

Explanation will be given below specifically on the present invention.
<Solid Electrolytic Capacitor>
The present invention provides a solid electrolytic capacitor comprising a anode foil, a cathode foil, and a separator arranged between the anode foil and the cathode foil, wherein the anode foil, the cathode foil, and the separator are wound with the separator between the anode foil and the cathode foil, the anode foil having a dielectric oxide film layer, the separator comprising a solid electrolyte and a nonwoven fabric holding the solid electrolyte, the nonwoven fabric forming the separator is laminated nonwoven fabric having at least two layers of nonwoven fabric layers, and the laminated nonwoven fabric comprising a nonwoven fabric layer (layer I) composed of ultra fine fiber having a fiber diameter of 0.1 to 4 μm (hereafter, it may be referred to as "an ultra fine fiber nonwoven fabric layer (layer I)" or simply "a nonwoven fabric layer (layer I)"), and a nonwoven fabric layer (layer II) composed of thermoplastic resin fiber having a fiber diameter of 6 to 30 μm (hereafter, it may be referred to simply as "a nonwoven fabric layer (layer II)" or "layer II").

FIG. 1 is a schematic drawing of the solid electrolytic capacitor of the present invention. A capacitor element 10, as the solid electrolytic capacitor of the present invention, is formed by winding an anode foil 2, a cathode foil 3 and a separator 1, which is a laminated nonwoven fabric. In a typical aspect of the present invention, for example, as shown in FIG. 1, four layers are wound around in the order of the separator 1, the anode foil 2, the separator 1 and the cathode foil 3. In the present invention, for example, as above, a capacitor element is composed so that the separator is intervened between the anode foil 2 and the cathode foil 3, that is, the anode foil and the cathode foil sandwich the separator.

To the anode foil 2 and the cathode foil 3, lead wires 4 and 5 are connected for connecting each electrode to the external side. The connection is attained by a known method such as stitching, ultrasound welding, caulking. These lead wires 4, 5 are electric conductive metal terminals composed of a connection part of the anode foil 2 and the cathode foil 3, and an external connection part having a role of electric connection with the external part. Electric energy is finally introduced to the external part from the winding capacitor element 10 via such a terminal. The lead wire is composed of, for example, aluminum or the like. It is preferable that the lead wire is subjected to processing such as plating to attain better electrical conduction property.

It is not especially limited as for a manufacturing method of the solid electrolytic capacitor relevant to the present invention, and known methods may be used. For example, a capacitor element with a structure shown in FIG. 1 may be manufactured by the following method. Firstly, the anode foil formed with a dielectric oxide film layer is prepared by chemical conversion coating or the like, and by overlapping the anode foil, separator, cathode foil, and separator in this order to wound-around these. Next, by impregnation of liquid, which is a material of a solid electrolyte, into the separator as the wound substance, the solid electrolyte layer is formed between electrodes. In this step, the solid electrolyte layer is formed by impregnation of liquid, which is a material of the solid electrolyte (a combination of various electrolyte monomers with an initiator, a polymerization agent or the like, or an electric conductive substance such as a complex), and then by performing processing corresponding to a material of the solid electrolyte, such as polymerization (in the case of the monomer), formation of the complex (in the case of the complex) or the like. The solid electrolyte layer may be formed by impregnation of an aqueous solution dispersed with of an electric conductive polymer, wherein fine particles of a polymer, in which a polymer and a dopant to be described later are bound, are dispersed, or an aqueous solution of the electric conductive polymer, or the like. It should be noted that an end part of the anode foil and the cathode foil may be derivatized by performing a re-chemical conversion coating step to be described later, before forming the above solid electrolyte layer.

The capacitor element is obtained by forming the solid electrolyte layer between the electrodes, putting the wound substance in an armored case (generally, a cylindrical metal case having a bottom), and then by sealing an opening part with a resin or the like.

In the case of performing the re-chemical conversion coating, in producing the solid electrolytic capacitor using a separator mainly composed of Manila hemp or a pulp-type paper material, which has generally been used as a separator, or a separator using many amount of other binders, before this step, a binder removal step has been performed, for removing the binder using a volatile solution such as water, alcohol (specifically, using a solution which dissolves only the binder). In addition, in the conventional separator, a drying step has been intervened so that Manila hemp or a pulp-type material does not contain moisture inside the capacitor element, or pulp or the like has been carbonized to attain a state that moisture is little contained. In addition, low impedance in a high frequency region is difficult to attain in the presence of moisture or the like, and it has been impossible to form a lower impedance element, by using a cellulose material as it is, because of high dielectric constant which the material has. In addition, in performing these carbonization step or the drying step, damage generated on a dielectric layer (that is, an oxide film layer formed on the anode foil, for example, an aluminum oxide layer), which will be a substantial anode. Therefore, in a conventional step, the re-chemical conversion coating step has been excessively performed, after the carbonization step or the drying step. In this re-chemical conversion coating step, it is necessary to form the dielectric oxide film layer, which will be a substantial anode, more uniformly (that is, without a pinhole or thickness distribution, and in more uniform thickness). By the uniform dielectric oxide film layer, withstand voltage of the capacitor element can be increased, leakage current can be suppressed low, and thus the capacitor element with high capacitance can be manufactured. Therefore, if the binder removal step is not necessary, heat generated by the carbonization step and the drying step can be further reduced, the dielectric oxide film layer can be uniformly formed, and thus the capacitor element with higher performance can be obtained. In addition, since plating of a lead wire undergoes oxidation due to heat applied in these steps, a lead wire made of silver or the like having larger oxidation resistance has been conventionally used in some cases. One major object of the present invention is to simplify such conventional steps and to attain uniformity of the dielectric oxide film layer.

[The Separator]

The separator includes a solid electrolyte and a nonwoven fabric holding the solid electrolyte, and the nonwoven fabric is a laminated nonwoven fabric having at least two layers of the nonwoven fabric layers.

(The Laminated Nonwoven Fabric)

The laminated nonwoven fabric includes the nonwoven fabric layer (layer I) and the nonwoven fabric layer (layer II). Specifically, the laminated nonwoven fabric is that having at least two layers, and has a nonwoven fabric layer (layer I) composed of ultra fine fiber having a fiber diameter of 0.1 to 4 μm, and a nonwoven fabric layer (layer II) composed of thermoplastic resin fiber having a fiber diameter of 6 to 30 μm. In this way, in the solid electrolytic capacitor of the present invention, the solid electrolyte and the dielectric oxide film layer can be finely and uniformly formed.

The nonwoven fabric layer (layer I) is composed of the ultra fine fiber having a fiber diameter of 0.1 to 4 μm. It should be noted that the term "ultra fine fiber" in the present description means fiber having the above fiber diameter of 0.1 to 4 μm. Layer I may contain fiber other than the above ultra fine fiber provided that it does not impair the effect of the present invention. However, typically, layer I is composed of only the above ultra fine fiber. The fiber diameter of 4 μm or less avoids excessively large inter-fiber space of the nonwoven fabric layer, and thus liquid (monomer or the like), as a material of a solid electrolyte, easily penetrates into inter-fiber space, resulting in formation of a fine and uniform solid electrolyte layer. In addition, in this case, since the fiber diameter is small, surface area per weight of the ultra fine fiber nonwoven fabric layer (layer I), i.e., specific surface area, can be large. In this way, a solid electrolyte layer, which is thin and uniform and has many contact points with the nonwoven fabric layer (layer I) and also a wide area, can be formed on a surface of the ultra fine fiber. Therefore, resistance of current passing through the nonwoven fabric layer can be decreased, even though an amount of the solid electrolyte is small. In addition, a chemical conversion solution used to form the dielectric oxide film layer (hereafter may be referred to also simply as "chemical conversion solution") easily soaks into fine parts of nonwoven fabric which is to be a separator, and a dielectric oxide film layer (for example, for an aluminum electrolytic capacitor, an aluminum oxide layer) can be formed in a uniform thickness, on the surface of the anode foil and the cathode foil. On the other hand, the fiber diameter of 0.1 μm or more is capable of easily forming the ultra fine fiber, and the ultra fine fiber formed does not generate scuffing or lint by surface friction or the like. This provides a favorable step for producing a capacitor. In addition, the dielectric oxide film layer and the solid electrolyte layer can be formed in a uniform structure. In this sense, a fiber diameter of the nonwoven fabric layer (layer I) is preferably 0.3 to 4 μm, more preferably 0.3 to 3.5 μm, and still more preferably 0.5 to 3 μm. It should be noted that the fiber diameter referred in the present description can be evaluated by measurement of fiber diameter with a microscope.

The nonwoven fabric layer (layer II) is composed of a thermoplastic resin fiber having a fiber diameter of 6 to 30 μm. The fiber diameter of 30 μm or less avoids a excessively large fiber diameter and is able to provide uniform inter-fiber distance, thus the fine and uniform solid electrolyte layer can be formed. The nonwoven fabric layer (layer II) may contain a fiber other than thermoplastic resin fiber having a fiber diameter of 6 to 30 μm, provided that it does not impair the effect of the present invention. However, typically, the nonwoven fabric layer (layer II) is composed of only the thermoplastic resin fiber having a fiber diameter of 6 to 30 μm. The fiber diameter of layer II is also important, as fiber diameter in above layer I. The diameter of the fiber composing layer II of 30 μm or less provides a uniform arrangement of the ultra fine fiber composing layer I between fibers composing the layer II, when layer I and layer II are laminated so as to contact each other. In this way, in the laminated nonwoven fabric, the ultra fine fiber is distributed more uniformly. As a result, the fine and uniform solid electrolyte layer can be formed via the ultra fine fiber layer which is more uniformly distributed. On the other hand, the diameter of fiber composing layer II of 6 μm or more provides sufficient strength of the laminated nonwoven fabric and thus stabilizes the winding step. In addition, since no shape corruption of the laminated nonwoven fabric which is to be a separator occurs in the subsequent step for forming the capacitor element, a capacitor can be stably formed. As a result thereof, an element with good performance can be formed. In this sense, the diameter of fiber composing layer II is preferably 8 to 25 μm, and more preferably 9 to 20 μm.

In the solid electrolytic capacitor of the present invention, the ultra fine fiber nonwoven fabric layer (layer I) may be installed inside or on the surface of a nonwoven fabric composed as a separator. Layer I has small inter-fiber space, uniform fiber distribution and still large specific surface area, because of the small fiber diameter thereof. By installing the solid electrolyte on the fiber surface of this layer I, layer I is contiguously present in the separator face direction, and a contiguous network of the solid electrolyte can be uniformly formed. In the present invention, as a supporting layer for reinforcing the ultra fine fiber nonwoven fabric layer (layer I), the nonwoven fabric layer (layer II) composed of thermoplastic resin fiber can be installed. Since the nonwoven fabric layer (layer II) protects the ultra fine fiber nonwoven fabric layer (layer I) from deformation and damage in each of steps of manufacturing a separator and a capacitor, the capacitor can be stably manufactured with reduced fraction defective.

In the present invention, the separator is the laminated nonwoven fabric comprising the nonwoven fabric layer (layer I) and the nonwoven fabric layer (layer II) having the fiber diameters specified above. It is considered that, by preparing the separator of such laminated nonwoven fabric, a nonwoven fabric structure finer than, for example, that formed using each of layer I and layer II alone, can be formed, resulting in the finer solid electrolyte layer. In particular, in the case where layer I and layer II are laminated so as to contact with each other, by arranging the ultra fine fiber composing layer I in the space of fiber composing layer II, fiber composing the nonwoven fabric can be more uniformly arranged. As a result, liquid (for example, a monomer which is a polymerizable compound giving an electric conductive polymer, and an initiator and an adjuvant to polymerize the monomer, or an aqueous solution dispersed with fine particles of an electric conductive polymer, or an aqueous solution of the electric conductive polymer, or the like) containing a material for forming the solid electrolyte diffuses more uniformly in the nonwoven fabric layer. The above liquid (for example, a monomer or the like) is impregnated into inter-fiber space of the nonwoven fabric layer, and after that, for example, by sequential polymerization or the like by an initiator or the like, a uniform solid electrolyte is formed as a result. During this process, viscosity of the liquid changes to form a more viscous substance, and finally the fine solid electrolyte layer is formed. In this process, interface tension of fiber and an electric conductive substance sequentially changes, and the electric conductive substance becomes more viscous Therefore, when fibers are too apart from each other, a non-uniform structure tends to be easily generated, resulting in difficulty to form the fine and uniform solid electrolyte layer.

In the laminated nonwoven fabric, layer I is indispensable to form a fine structure, and layer II allows the laminated nonwoven fabric to be more stable (i.e., imparts good tensile strength, flexural strength and surface wear performance of the nonwoven fabric), and is indispensable to stably hold layer I in each step. For this reason, the laminated nonwoven fabric having above layer I and layer II is advantageous to produce the solid electrolytic capacitor having good performance.

In the present invention, in order to more stably manufacture the solid electrolytic capacitor, a laminated nonwoven fabric composed of three layers is more preferable. More specifically, a laminated nonwoven fabric is preferably composed of the two nonwoven fabric layers (layer II) and a nonwoven fabric layer (layer I) present as an intermediate layer between the nonwoven fabric layers (layer II). In this case, the nonwoven fabric layer (layer II) composes both surfaces of the laminated nonwoven fabric, and layer I is present sandwiched by layer IIs. If both surfaces of the laminated nonwoven fabric are layer II, surface wear, scuffing and lint are not generated, resulting in better performance of the capacitor element and decrease of fraction defective as well, when external force such as friction is applied. In particular, since friction is applied to a separator in various steps included in the winding step, it is preferable to suppress deterioration of a surface structure by the above three-layer structure.

In a particularly preferable aspect, the laminated nonwoven fabric is composed of two nonwoven fabric layers (layer II) and a nonwoven fabric layer (layer I) present as an intermediate layer between the nonwoven fabric layers (layer II), a fiber diameter of the ultra fine fiber in the nonwoven fabric layer (layer I) being 0.1 to 4 μm, and a fiber diameter of the thermoplastic resin fiber in the nonwoven fabric layer (layer II) being 6 to 30 μm.

In the present invention, a thickness of a laminated nonwoven fabric to be used as a separator is preferably 10 to 80 μm. The thickness of the laminated nonwoven fabric of 10 μm or more provides high strength of a slit laminated nonwoven fabric, and thus enables good winding in the winding step, leading to decrease of fraction defective in the processing step. In a capacitor element, a width of the separator is usually several mm. The smaller width provides the less strength of the separator, leading to easy cutting. In addition, the thickness of 10 μm or more is capable of sufficiently holding inter-electrode distance in the manufacturing step of the capacitor element, leading to no generation of insulation defect in the capacitor element. On the other hand, the thickness of the laminated nonwoven fabric of 80 μm or less avoids excessively large thickness of the anode foil, the cathode foil and the separator wound, thus enables to provide a compact product as electronics parts. In addition, when a capacitor component with specified size is provided, larger area can be wound to provide higher capacitance per unit volume. In addition, the thickness of 80 μm or less provides more reduced moisture entrained from the laminated nonwoven fabric, as the separator, to the capacitor, resulting in a capacitor element with higher performance. In this sense, the thickness of the laminated nonwoven fabric is more preferably 15 μm to 50 μm. It should be noted that the thickness described in the present description can be measured in accordance with JIS L-1906.

In the present invention, it is preferable that weight of the laminated nonwoven fabric to be used as a separator is 7 to 50 g/m$^2$. The weight of the laminated nonwoven fabric of 7 g/m$^2$ or more provides high strength of a slit laminated nonwoven fabric, and thus enables good winding in the winding step, leading to decreased fraction defective in the processing step. In addition, since a chemical conversion solution and liquid (a monomer or the like for forming a polymer electrolyte), which is to be a material of a solid electrolyte, easily soak into a laminated nonwoven fabric which is to be a separator, a capacitor element with high withstand voltage and high capacitance can be formed. In addition, the weight of the laminated nonwoven fabric of 7 g/m$^2$ or more provides also easy formation of the laminated nonwoven fabric itself, and provides the laminated nonwoven fabric without unevenness (that is non-uniform surface shape), resulting in enabling to reduce fraction defective of the capacitor element. On the other hand, the weight of the laminated nonwoven fabric of 50 g/m$^2$ or less enables to reduce moisture amount entrained from the laminated nonwoven fabric to the capacitor element, thus providing good capacitor performance due to the above reason. In addition, in the case where a constant thickness is required for a separator, the weight of 50 g/m$^2$ or less avoids excessively large weight of the laminated nonwoven fabric, and provides fiber space suitable to form the solid electrolyte layer, leading to increased electrical conduction property of the capacitor element and enabling to form an element with low ESR. In this sense, the weight of the laminated nonwoven fabric is more preferably 15 to 40 g/m².

In a particularly preferable aspect, the laminated nonwoven fabric has a thickness of 10 to 80 μm, and a weight of 7 to 50 g/m².

Apparent density of the laminated nonwoven fabric, calculated from the above thickness and weight, is preferably 0.2 to 0.8 g/cm³.

In the laminated nonwoven fabric to be used as a separator in the present invention, ratio of weight of the nonwoven fabric layer (layer I) to weight of the nonwoven fabric layer (layer II) in the laminated nonwoven fabric is preferably in a range to be described below.

That is, in the present invention, the weight of the nonwoven fabric layer (layer I) is preferably 0.5 to 25 g/m², and more preferably 1.5 to 10 g/m². The weight of the layer I of 0.5 g/m² or more avoids excessively large inter-fiber space, and thus an electric conductive monomer or the like for forming a solid electrolyte layer easily impregnates into inter-fiber space, resulting in formation of a finer and more uniform solid electrolyte layer. In addition, a chemical conversion solution easily soaks into fine parts of a nonwoven fabric which is to be a separator, and thus a dielectric oxide film layer (for example, for an aluminum electrolytic capacitor, an aluminum oxide layer) can be formed in more uniform thickness. The weight of layer I of 25 g/m² or less provides easy setting of total thickness of the laminated nonwoven fabric, and avoids excessive consumption of the solid electrolyte layer formed inside the nonwoven fabric layer to suppress cost.

In the present invention, it is preferable that weight of the nonwoven fabric layer (layer II) is 5 to 35 g/m² and more preferably 10 to 30 g/m². The weight of layer II of 5 g/m² or more enables layer I, which is an ultra fine fiber layer, to provide sufficiently uniform inter-fiber distance, and thus forms a finer and more uniform solid electrolyte layer. That is, as also described regarding specification of the fiber diameter, the ultra fine fiber layer composing layer I can be more uniformly arranged between fibers composing layer II. As a result, the ultra fine fiber can be uniformly distributed in the laminated nonwoven fabric. Therefore, the finer and more uniform solid electrolyte layer can be formed with the ultra fine fiber layer distributed more uniformly. In addition, the weight of layer II of 5 g/m² or more provides the laminated nonwoven fabric having good strength, stabilizes the winding step, and prevents shape corruption of the laminated nonwoven fabric layer as the separator, even in the subsequent manufacturing step of a capacitor element. In this way, the capacitor can be stably manufactured, resulting in an element with good performance. On the other hand, the weight of layer II of 35 g/m² or less provides easy setting of total thickness of the laminated nonwoven fabric in a preferable range.

It is preferable that ratio of weight (i) of the nonwoven fabric layer (layer I) to weight (ii) of the nonwoven fabric layer (layer II) in the laminated nonwoven fabric, (i)/(ii), wherein, for example, in the case where two or more layers I and/or two or more layers II are present, such as the case where layers II are present at both surfaces of the laminated nonwoven fabric, ratio is of total of each of layers I and II), is, although not limited thereto 1/10 to 2/1, in order to impart good strength to the laminated nonwoven fabric and form a fine structure with small inter-fiber space. The above ratio is more preferably 1/8 to 1/1. When layer I has the weight larger than (i)/(ii) of 1/10, layer I is easily formed without unevenness in a plane direction of the nonwoven fabric. When layer II has the weight larger than (i)/(ii) of 2/1, it easily provides good strength which avoids the whole laminated nonwoven fabric to deform upon slitting, winding and heat processing. The thickness and the weight of the laminated nonwoven fabric and each of nonwoven fabric layers composing it should be selected as appropriate in a range which may ensure the thickness and the weight necessary for the separator.

In the present invention, it is preferable that thermoplastic resin fiber in the nonwoven fabric layer (layer II) is a thermoplastic synthetic filament. The nonwoven fabric composed of the thermoplastic synthetic filament can have sufficient strength even in a micro-slit product. In addition, the nonwoven fabric composed of the thermoplastic synthetic filament generates little lint upon slitting and undergoing friction or the like from the outside, and has high wear resistance. As a result, a step of manufacturing an element of the solid electrolytic capacitor is more stabilized, and thus provides a high performance capacitor element. An example of the thermoplastic synthetic filament includes filament composed of a crystalline resin, as described below. On the other hand, when staple fiber is used as the thermoplastic resin fiber, for example, the above crystalline resin and a thermoplastic resin having melting point lower than melting point of the above crystalline resin, can be blended to use. In this blending, fibers composed of a single type of resin respectively may be blended, or otherwise two or more types of resins having different melting points may be included in one fiber. For example, sheath-core yarn composed of a sheath and a core may be used, where a melting point of a thermoplastic resin for a sheath is lower than a melting point of a thermoplastic resin for a core. For example, sheath-core yarn composed of a PET core and a copolymer PET sheath may be used.

In the present invention, it is preferable that the thermoplastic resin in the nonwoven fabric layer (layer II) is a crystalline resin having a melting point of 180° C. or higher. The melting point of 180° C. or higher can form a stable separator structure, even after passing each thermal history (processing where heat is applied in manufacturing of the capacitor element, such as a drying step, a carbonization step and a thermal strain removal step) in a manufacturing step of the capacitor. In addition, the melting point of 180° C. or higher stably maintains a capacitor element structure against heat applied by general soldering or reflow soldering, in the case of surface mounting the solid electrolytic capacitor of the present invention, as a capacitor component, on a circuit board, thus preventing deterioration of capacitor performance and decreasing fraction defective. These step stability is designed as appropriate by the relevant person in response to a step for producing the solid electrolytic capacitor element, and surface mounting condition of parts. In the above sense, melting point of a thermoplastic resin, as the above crystalline resin, is preferably 220° C. or higher, more preferably 240° C. or higher, and preferably 350° C. or lower, as well. In particular, in the case of the crystalline polymer having a melting point of 180° C. or higher, effect as included above is exerted well.

It should be noted that the term "a crystalline resin" described in the present description means a resin having a crystallinity of 10% or higher, measured by a differential scanning calorimeter (DSC) in a nonwoven fabric state. In the measurement of crystallinity using the DSC, crystallinity (Xc) is determined by calculation of heat of fusion (ΔH), under measurement condition of a sample weight of 5 mg, a temperature raising rate of 10° C./min, and a scanning temperature of 50 to 300° C. Xc is determined by the following equation.

$$Xc = (\Delta HTm - \Delta HTcc)/(\Delta H0) * 100 \qquad (1)$$

wherein Xc represents crystallinity (%); ΔHTm represents heat of fusion at melting point (J/g); ΔHTcc represents heat amount of crystallization (J/g); and ΔH0 represents literature value of heat of fusion at crystallinity of a resin of 100% (J/g).

In the present invention, a specific example of the crystalline resin, having the melting point of 180° C. or higher, includes a polyalkylene terephthalate resin (PET, PBT, PTT or the like) and derivatives thereof; a polyamide resin such as N6, N66, N612 and derivatives thereof; a polyketone-type resin such as a polyoxymethylene ether-type resin (POM or the like), PEN, PPS, PPO, a polyketone resin, PEEK; a thermoplastic polyimide resin such as TPI; and the like. In addition, a copolymer or a mixture mainly composed of these resins is also preferable. By adding small amount of a low melting point component such as a polyolefin, modification may be performed within a range not to influence practical strength. It should be noted that, among the above specific examples, because the polyamide resin such as N6, N66, N612 and derivatives thereof have large water absorption rate as a synthetic resin, in view of water absorption property, resins other than the polyamide-type resin and derivatives thereof are advantageous. In addition, in view of easiness, versatility and cost in producing fiber and nonwoven fabric, a PET-type resin, a PPS-type resin, and a PEEK-type resin are preferable. In addition, in view of electric characteristics such as dielectric constant, tan δ, a PET-type resin, a PPS-type resin, a PPO-type resin, and a PEEK-type resin are preferable. In considering that a resin remains in parts, which is a capacitor element, it is preferable to select a resin having good electric characteristics to attain lower ESR. The thermoplastic resin to be used in forming the nonwoven fabric layer (layer II) is selected as appropriate in response to intended use of the solid electrolytic capacitor of the present invention.

In the present invention, a composition material of the nonwoven fabric layer (layer I) is not especially limited, as long as it is ultra fine fiber with a fiber diameter of 0.1 to 4 μm, and it may be a thermoplastic resin, it may be, for example, a material without thermoplastic property, such as cellulose fibril. A suitable one is a thermoplastic resin, similarly as in the above nonwoven fabric layer (layer II). Specifically, there are included a polyalkylene terephthalate resin (PET, PBT, PTT or the like) and derivatives thereof; a polyamide resin such as N6, N66, N612 or the like and derivatives thereof; a polyketone-type resin such as a polyoxymethylene ether-type resin (POM or the like), PEN, PPS, PPO, a polyketone resin, PEEK; a thermoplastic polyimide resin such as TPI; and the like. In addition, a copolymer or a mixture mainly composed of these resins is also preferable. A thermoplastic resin fiber having low water absorbing rate is more suitable, similarly as in the above nonwoven fabric layer (layer II). In addition, in view of easiness, versatility and cost in producing fiber and nonwoven fabric, a PET-type resin, a PPS-type resin, and a PEEK-type resin are preferable. In addition, in view of electric characteristics such as dielectric constant, tan δ, a PET-type resin, a PPS-type resin, a PPO-type resin, and a PEEK-type resin are preferable. In considering that a resin remains in parts, which is a capacitor element, it is preferable to select a resin having good electric characteristics to attain lower ESR. The thermoplastic resin to be used for forming the nonwoven fabric layer (layer I) is selected as appropriate in response to intended use of the solid electrolytic capacitor of the present invention.

A resin forming the nonwoven fabric layer (layer I) and the nonwoven fabric layer (layer II), composing laminated nonwoven fabric, may be the same substance or may be a different substance, however, it is preferable to be the same substance for aiming to form the laminated nonwoven fabric more uniformly. In the case of forming layer I and layer II using a resin of the same substance, because of easy formation of nonwoven fabric having more uniform space of fiber, the uniform and fine solid electrolyte layer is formed easily, in the case of using such nonwoven fabric as the separator.

Nonwoven fabric is composed of fiber and void, which is space of fiber, and shape of the void is generally random. For example, in general spunbond nonwoven fabric (with a fiber diameter of 15 μm to 40 μm), average pore size is over 30 μm, and maximum pore size is over 50 μm. That is, inside the nonwoven fabric, the space with a diameter of about 50 μm or more is included. In particular, in the case of nonwoven fabric with small weight and thin thickness, there is present a portion having a pore size of several mm at the maximum. In case of too large pore size, liquid, which will be a material of a solid electrolyte (an electrolyte monomer for forming an electric conductive polymer, or the like), soak to that pore part and cannot form a liquid film, and when a solid electrolyte layer is formed, that pore part becomes a part where the electrolyte layer is absent. Accordingly, such a large pore size leads to performance deterioration (increase in internal resistance and insufficient capacitance) of a capacitor element. In particular, width of a winding type separator will be several mm, in the case of a fine type, and a separator with large pore size not only inhibits increase in performance but also leads to increase in fraction defective.

In this sense, the laminated nonwoven fabric used in the present invention provides small inter-fiber distance, i.e., small pore size, and easy formation of a uniform solid electrolyte, since it has the nonwoven fabric layer (layer I) composed of ultra fine fiber. Therefore, an average pore size of the laminated nonwoven fabric in the present invention is preferably from 0.3 μm to 20 μm. The average pore size is more preferably 1 μm to 15 μm. When the average pore size is 0.3 μm or larger, a chemical conversion solution and liquid, which is to be a material of a solid electrolyte (a monomer or the like for forming an electric conductive polymer) easily soaks into a pore, resulting in high performance withstand voltage, high capacitance and low inner resistance. In addition, the average pore size of 20 μm or smaller provides suitable inter-fiber distance, easy formation of a liquid film of a monomer or the like for forming a solid electrolyte, and consequently a good solid electrolyte layer, resulting in a high performance capacitor element with high capacitance and low inner resistance. It should be noted that the average pore size of 0.3 μm or larger avoids an excessively long period of time for penetration of a chemical conversion solution and liquid which is to be a material of a solid electrolyte (a monomer or the like for forming an electric conductive polymer), and thus enables efficient designing of a manufacturing time for a capacitor.

A production method for each nonwoven fabric layer to be used in the present invention is not especially limited. However, a production method for the nonwoven fabric layer (layer II) may preferably be the spunbond method, the dry-type method and the wet-type method. In addition, a production method for the ultra fine fiber nonwoven fabric layer (layer I) may preferably be a dry-type method, a wet-type method or the like using the ultra fine fiber, or an electrospinning, a melt blown method or the like. In view of enabling to form the ultra fine fiber nonwoven fabric layer easily and finely, the nonwoven fabric layer (layer I) is formed by the melt blown method particularly preferably. In addition, fiber may be used to produce nonwoven fabric, after attainment of fiber splitting or fibrillation by beating, partial dissolution or the like.

As a method for forming the laminated nonwoven fabric by laminating a plurality of layers having the nonwoven fabric layer (layer I) composed of the ultra fine fiber, and the nonwoven fabric layer (layer II) composed of the thermoplastic resin fiber, there are included, for example, a method for integration by thermal bonding, a method for making three dimensional entanglement by jetting fast-water stream, a method for integration using particulate or fibrous adhesives, and the like. Among these, it is preferable to form the laminated nonwoven fabric using integration by thermal bonding. As the integration method by thermal bonding, there are included integration by a thermal embossing (a thermal emboss roll system) and integration by high temperature hot air (an air through system). The integration by thermal bonding is preferable in view of maintaining tensile strength and flexural flexibility of nonwoven fabric, and maintaining heat resistance stability.

The integration by thermal bonding is preferable in view of being capable of forming the laminated nonwoven fabric having a plurality of the nonwoven fabric layers, without using a binder. Use of the binder, in the case of forming the laminated nonwoven fabric by integration of fibers themselves, leaves the binder in a capacitor element. There is not any particular problem, as long as the binder does not deteriorate capacitor element performance, however, in the case where deterioration of capacitor performance is promoted by the binder, a step for removing the binder is required newly. In addition, in the case where the step for removing the binder is required, because a volatile solvent such as water, alcohol is usually used, there is generated a worry that this solvent remains in the element. In addition, the binder has given adverse influence on formation of a good metal oxide film layer and formation of a solid electrolyte layer. That is, when the binder remained, adsorption of the remained binder at the surface of a metal foil tended to cause a pinhole at the oxide film layer or non-uniform thickness thereof, which has lead to decrease in withstand voltage or generation of a short circuit. In addition, inhibition of formation of the solid electrolyte layer, by mixing-in of the binder, led to decrease in capacitance and increase in inner resistance. Because of the above reason, the laminated nonwoven fabric integrated only by heating, without using the binder, is preferable.

Still more, also in view of rationality of the forming step of the laminated nonwoven fabric, integration only by thermal bonding is preferable, because of capability of reducing cost further.

Integration by thermal bonding can be attained by thermal adhesion of two or more layers of the nonwoven fabrics composing the laminated nonwoven fabric. The thermal adhesion step may be attained by performing joint using a flat roll, for example, at temperature lower than melting point of the thermoplastic resin (preferably thermoplastic resin filament) by 50 to 120° C., and under a linear pressure of 100 to 1000 N/cm. The linear pressure of below 100 N/cm in the thermal adhesion step may sometimes provide difficulty in exerting sufficient strength by obtaining sufficient adhesion. In addition, the linear pressure of over 1000 N/cm increases fiber deformation and increases apparent density, and thus it may be difficult to obtain the effect of the present invention in some cases.

Most preferable one is a method for sequentially producing a spunbond nonwoven fabric layer, a melt blown nonwoven fabric layer and/or a spunbond nonwoven fabric layer, laminating these, and pressure bonding these using an emboss roll or a heat press roll. This method is preferable to obtain uniform nonwoven fabric with low weight, because of enabling to form the laminated nonwoven fabric using the same material, and produce it in a continuous integrated production line. Specifically, such a integration method is preferable that is performed by spinning one or more layers of spunbond nonwoven fabric layers on a conveyor using a thermoplastic resin (preferably, synthetic thermoplastic resin), blowing one or more layers of ultra fine fiber nonwoven fabric layers with a fiber diameter of 0.1 to 4 μm, by the melt blown method using a thermoplastic resin (preferably, synthetic thermoplastic resin), and then laminating one or more layers of nonwoven fabric (preferably, synthetic thermoplastic resin filament nonwoven fabric) composed of a thermoplastic resin fiber, using the thermoplastic resin (preferably, synthetic thermoplastic resin), and next by pressure bonding these layers using an emboss roll or a flat roll.

Use of the above production method enables the ultra fine fiber obtained by the melt blown method to intrude inside a layer (preferably, a synthetic thermoplastic resin filament nonwoven fabric layer) composed of the thermoplastic resin fiber, because the ultra fine fiber nonwoven fabric layer obtained by the melt blown method can be blown directly on the layer (preferably, the synthetic thermoplastic resin filament nonwoven fabric layer) composed of the thermoplastic resin fiber. In this way, by intrusion and fixation of the ultra fine fiber obtained by the melt blown method inside the layer (preferably, the synthetic thermoplastic resin filament nonwoven fabric layer) composed of the thermoplastic resin fiber, not only strength of a structure itself of the laminated nonwoven fabric is enhanced but also transfer of the ultra fine fiber nonwoven fabric layer by external force becomes difficult, and thus space inside the nonwoven fabric layer (preferably, the synthetic thermoplastic resin filament nonwoven fabric layer) composed of the thermoplastic resin fiber can be made more uniformly by the ultra fine fiber layer. In this way, securing of suitable inter-fiber distance described above, and formation of the laminated nonwoven fabric having suitable pore size distribution become easy. That is, according to the above method, since the continuous layer I can be maintained, while a part of layer I intrudes in layer II, in the laminated nonwoven fabric, diffusion of liquid, which will be a material of a solid electrolyte (a monomer or the like for forming an electric conductive polymer), inside the face of the nonwoven fabric becomes uniform.

Crystallinity of fiber (that is, melt blown fiber) formed by the melt blown method can be adjusted to a range of 5 to 40% under general melt blown spinning condition. It should be noted that crystallinity may be evaluated, for example, by a method using the above DSC. Specifically, a polymer forming the laminated nonwoven fabric can attain the above crystallinity, by means of using such a resin that has a solution viscosity (ηsp/c) of preferably 0.2 to 0.8, and still more preferably 0.2 to 0.6, when measured using a viscosity tube in a constant temperature water tank with a concentration of 0.01 g/mL and a temperature of 35° C., when o-chlorophenol (OCP) is used as a solvent. In nonwoven fabric to be used in the present invention, from the viewpoint that high dimensional stability in a wet state is preferable, it is preferable to compose the melt blown fiber by using a resin selected from a PPS resin and a PPS resin, and that solution viscosity (ηsp/c) of the resin is 0.2 to 0.8. Crystallinity of the melt blown fiber is more preferably 10 to 40%.

In the present invention, it is preferable that the laminated nonwoven fabric has been subjected to calendering. In this case, a more uniform structure can be given to the laminated nonwoven fabric. Specifically, after joining fiber using the above heat adhesion step, calendering is performed, under condition of at temperature higher than the above heat adhesion temperature by 10° C. or more, and lower than melting point of thermoplastic resin fiber (preferably thermoplastic resin filament) by 10 to 100° C., and under a linear pressure of 100 to 1000 N/cm. By such calendering, the laminated nonwoven fabric can have good strength and apparent density in a particularly preferable range (for example, within a range described in the present description).

In the case where calendering temperature is lower than melting point of thermoplastic resin fiber (preferably thermoplastic resin filament) and that the difference thereof is below 10° C., there is tendency to provide too high apparent density, and in the case where the temperature is lower than melting point of thermoplastic resin fiber (preferably thermoplastic resin filament) and that the difference thereof is over 100° C., it is difficult to obtain sufficient strength, as well as scuffing generates at the surface, which impairs surface smoothness and tends to become difficult to provide a uniform structure of a capacitor element.

When linear pressure in the calendering is below 100 N/cm, it is difficult to obtain sufficient adhesion and there is tendency not to exert sufficient strength. In addition, when it is over 100 N/cm, fiber deformation becomes large, apparent density increases, and thus it may be difficult to obtain the effect of the present invention in some cases.

In the present invention, it is also a preferable aspect that the laminated nonwoven fabric is subjected to hydrophilization processing. When the laminated nonwoven fabric is subjected to hydrophilization processing, since impregnation of a chemical conversion solution and a monomer or the like for forming a solid electrolyte into nonwoven fabric becomes easy, a higher performance capacitor element can be manufactured. As the hydrophilization processing, such methods are adopted as a physical processing method: that is, hydrophilization by corona processing or plasma processing, as well as a chemical processing method: that is, introduction (introduction of a sulfonic acid group, a carboxylic acid group or the like by oxidation processing or the like) of a surface functional group, processing by means of using a treating agent such as a water-soluble polymer (PVA, polystyrene sulfonic acid and polyglutamic acid) and a surfactant (non-ionic, anionic, cationic and amphoteric surfactant) or the like; or the like. Use amount of the treating agent, introduction amount of the functional group, and the like can be selected in consideration of affinity to a monomer or the like for forming the solid electrolyte. However, since the hydrophilization processed laminated nonwoven fabric may tend to absorb moisture afterwards, processing amount (that is, mass of the treating agent and the functional group to be introduced, relative to mass of the laminated nonwoven fabric) is preferably 3% by mass or less.

[The Solid Electrolyte]

In the present invention, a solid electrolyte is held by nonwoven fabric typically as a solid electrolyte layer. An electric conductive substance to be used for forming the solid electrolyte is not especially limited. Typically, liquid such as a monomer (that is, an electrolyte monomer), which is a polymerizable compound giving an electric conductive polymer, or an aqueous solution dispersed with fine particles of an electric conductive polymer, or an aqueous solution of the electric conductive polymer, or the like can be used. As the electrolyte monomer, there is included, for example, a monomer which is a polymerizable compound such as ethylenedioxythiophene (for example, 3,4-ethylenedioxythiophene), pyrrole, thiazole, acetylene, phenylenevinylene (for example, p-phenylenevinylene), aniline, phenylene, thiophene, imidazole, furan, or the like, and substituted derivatives thereof, or the like.

In addition, as the electric conductive polymer, there is included, for example, an electron conjugated-type polymer, such as polyethylenedioxythiophene, polypyrrole, polythiazole, polyacetylene, polyphenylenevinylene (for example, poly-p-phenylenevinylene), polyaniline, polyvinylene, polyphenylene, polythiophene, polyimidazole, polyfuran, or the like, and derivatives thereof, or the like. In addition, a preferable one is an electric conductive polymer containing a substance to furnish a dopant to these electron conjugated-type polymers. Further, as other electric conductive substances, a tetracyanoquinodimethane complex (TCNQ complex) and derivatives thereof, or the like may also be used. In addition, in response to each electric conductive substance, an oxidizing agent, a polymerization agent or a complex forming agent to solidify it can be selected and they are used as appropriate to form a uniform solid electrolyte. In addition, as a more preferable aspect, a polymer is formed between polystyrene sulfonic acid or polyvinyl sulfonic acid, as a dopant, and the above electric conductive polymer to form the solid electrolyte layer by impregnation of this polymer into nonwoven fabric. For example, in a preferable aspect, the solid electrolyte layer is formed uniformly onto a separator by impregnation of polymer of 3,4-ethylenedioxythiophene and polystyrene sulfonic acid or polyvinyl sulfonic acid into nonwoven fabric, and then formation of the solid electrolyte layer, to be able to enhance electrical conduction property further. In the present invention, a material to form the solid electrolyte is not especially limited, and those skilled in the art select it so as to form the solid electrolyte with more uniformity and high electrical conduction property. For example, in order to produce a capacitor element using polyethylenedioxythiophene as the solid electrolyte, there may be adopted a method for repeating, in predetermined number of times, a step wherein a mixed solution obtained by mixing 3,4-ethylenedioxythiophene and an oxidizing agent using iron (III) p-toluene sulfonate dissolved in ethylene glycol, is impregnated into a capacitor element (that is, a capacitor element where the anode foil and the cathode foil are wound around via the separator), and it is stood at a temperature of 25° C. to 100° C., for 15 hours to 2 hours, suitably at a temperature of 50° C., for 4 hours. Details of this method are described in JP-A-9-293639.

However, a material (monomer or the like) for forming a solid electrolyte is in a low viscosity state at an initial state of being impregnated into nonwoven fabric, and the material (monomer or the like) is usually impregnated with a solvent for developing the material. This material (monomer or the like), in shifting to a solid state with progress of polymerization or the like, firstly becomes a liquid state with higher viscosity and finally a solid state. Therefore, in this case, it is necessary that nonwoven fabric impregnates the material (monomer or the like) more uniformly, even in a low viscosity state, and the nonwoven fabric holds an electrolyte layer more uniformly, even in a state that with increase in viscosity, cohesion force of the electrolyte increases to give a state becoming an electrolyte layer. In the present invention, since nonwoven fabric as a desired more uniform separator material is used, inter-fiber distance of the nonwoven fabric is maintained suitably. Accordingly, formation of a uniform solid electrolyte, which is one of the important factors for producing a high performance solid electrolytic capacitor, can be attained.

[The Anode Foil and the Cathode Foil]

The anode foil and the cathode foil to be used in the present invention are usually metal foil materials.

In order to excellently exert performance as a capacitor, it is preferable to use a metal having valve action. As the metal having the valve action, the one usually to be used may be used. In particular, an aluminum foil and a tantalum foil are preferable.

It is more preferable that a metal foil to be used for an anode and a cathode has been subjected to etching to increase area of an electrode, in view of obtaining good capacitor performance.

In particular, as the anode foil, a foil formed with a dielectric oxide film layer is used. Using this foil, good capacitor performance is obtained.

That is, as the electrode foil to be used in the present invention, a better foil may be selected for aiming to enhance capacitor performance.

Dimension of the anode foil and the cathode foil is arbitrary in response to specifications of the solid electrolytic capacitor to be manufactured. Dimension of the separator is also arbitrary, however, it is preferable to use the one having a little larger width dimension than dimension of the anode foil and the cathode foil, in response to dimension of both electrode foils. In this way, since direct contact of the anode foil and the cathode foil is inhibited by the separator, generation risk of a short circuit decreases. In the winding step, tensile tension is applied onto a material which will be the separator. In this case, inferior dimensional stability in a width direction of the separator leads to performance deterioration and increase in fraction defective by this tensile tension.

The anode foil has a dielectric oxide film layer on the surface. The dielectric oxide film layer is usually formed by converting a surface to a dielectric substance by chemical conversion coating of the anode foil. Chemical conversion coating is attained by applying voltage in a usually used chemical conversion solution, for example, an aqueous solution of ammonium borate, ammonium adipate or the like, to form an oxide film layer, which will be a dielectric substance, onto the metal foil surface. It should be noted that in the present invention, re-chemical conversion coating may be performed after winding around the anode foil, the cathode foil and the separator, to convert an end part of the electrode foil to a dielectric substance (oxidation processing), and to form a more uniform oxide film layer. The re-chemical conversion coating can be attained by applying voltage in a usually used chemical conversion solution, for example, an aqueous solution of ammonium borate, ammonium adipate or the like, to form an oxide film layer, which will be a dielectric substance, onto the metal foil surface.

EXAMPLES

Explanation will be given below further on the present invention with reference to EXAMPLES, however, the present invention should not be limited thereto. It should be noted that measurement methods and evaluation methods are as follows. In nonwoven fabric, a length direction means an MD direction (a machine direction), and a width direction means a direction vertical to the length direction, unless otherwise described specifically.

(1) Weight (g/m$^2$)

Test pieces with a length of 20 cm and a width of 25 cm were sampled at total 9 positions per 1 m×1 m; 3 positions per 1 m in a width direction, and 3 positions per 1 m in a length direction of a sample; in accordance with a method specified by JIS L-1906, to measure mass thereof, and average value thereof was determined by conversion to mass per unit area.

(2) Thickness (mm)

In accordance with a method specified by JIS L-1906, thickness was measured at 10 positions per 1 m of width, and average value thereof was determined. Measurement was performed under a load of 9.8 kPa.

(3) Apparent Density (g/cm$^3$)

Apparent density was calculated by the following equation, using weight (g/cm$^3$) measured in the above item (1) and thickness (mm) measured in the above item (2).

$$\text{Apparent density}=(\text{weight})/(\text{thickness})$$

(4) Fiber Diameter (μm)

Square test pieces having a of 1 cm square respectively were cut out from each section by a width of 20 cm of the sample, after removing each end parts of the samples (nonwoven fabric) by 10 cm. As for each test piece, fiber diameter was measured at 30 points with a microscope to calculate average value of the measured value (rounded off to one decimal place), which was adopted as diameter of fiber composing the sample.

(5) Opening Size Distribution (Average Flow Amount Pore Size and Maximum Pore Size)

Perm-Porometer, manufactured by PMI Co., Ltd. (model: CFP-1200AEX) was used. In measurement, Silwick, manufactured by PMI Co., Ltd., was used as immersion liquid, and the sample was immersed in immersion liquid, and measured after sufficient deaeration.

In the present measurement apparatus, a filter was used as a sample, and the filter was immersed into liquid whose surface tension has been known in advance, and the filter was pressurized from a state that all fine pores of the filter is covered with a liquid film, to measure diameter of the fine pore calculated using pressure, under which the liquid film is destroyed, and surface tension of the liquid. The following numerical expression was used for calculation.

$$d=C*r/P$$

(wherein d (unit: μm) represents pore size of the filter, r (unit: N/m) represents surface tension of the liquid; P (unit: Pa) represents pressure under which the liquid film having that pore size is destroyed; and C represents constant.)

Flow rate (wet flow rate), in the case where pressure P to be applied onto the filter immersed in the liquid is changed continuously from low pressure to high pressure, is measured from the above numerical expression. Under initial pressure, flow rate is zero, because even the liquid film of the largest fine pore is not destroyed. With increase in pressure, the liquid film of the largest fine pore is destroyed, and thus flow rate generates (bubble point). With further increase in pressure, flow rate increases corresponding to each pressure. Flow rate under pressure where the liquid film of the smallest fine pore is destroyed is coincident to flow amount in a dry state (dry flow amount).

In a measurement method using the present measurement instrument, value obtained by dividing wet flow amount under certain pressure with dry flow amount under the same pressure is called accumulated filter flow amount (unit: %). Pore size of the liquid film destroyed under pressure providing the accumulated filter flow amount of 50% is called average flow amount pore size. This average flow amount pore size is adopted as average pore size of the laminated nonwoven fabric of the present invention.

Maximum pore size of the laminated nonwoven fabric of the present invention was measured using nonwoven fabric as the above filter sample, and defined to be pore size of the liquid film destroyed in a range where the accumulated filter flow amount is 50%−2σ, that is, under pressure where the accumulated filter flow amount is 2.3%. Measurement was performed at three points by each sample, by the above measurement method, and average flow amount pore size and maximum pore size were calculated as average value thereof.

(6) Tensile Strength (kg/5 cm)

Each end part of a sample (unwoven fabric) was removed by 10 cm, and test pieces with a width of 3 cm and a length of 20 cm were cut out at each 5 places per a width of 1 m. Load was applied till the test piece was broken to determine average value of strength of the test piece in an MD direction, under maximum load.

(7) Melting Point (° C.)

Measurement was performed using the following measurement instrument, and temperature where an asymptotic line of an inflection point in an introduction part of a melting peak, and a base line in a temperature region higher than Tg intersect was adopted as melting point.

Melting point was measured under the following condition, using a differential scanning calorimeter (DSC210, manufactured by SIT Nanotechnology Co., Ltd.).

Measurement atmosphere: Nitrogen gas of 50 ml/minute;
Temperature raising rate: 10° C./minute;
Measurement temperature range: 25 to 300° C.

(8) Surface Wearability

Measurement was performed by sampling 5 sample pieces (a width of about 30 cm and a length of 3 cm) per 1m of width, in a width direction of a sample (nonwoven fabric), and using a friction testing machine, II-type (JSPS-type), described in JIS L-0849, "a test method for dye fastness against friction". The test piece was attached so that a measurement face contacts to both a test stand and a friction probe, and reciprocal friction was repeated 30 times, to perform appearance inspection of the nonwoven fabric after friction under the following standards. It should be noted that in Tables 4 to 6, "surface" means a layer shown at the most left of layer composition in each of Examples and Comparative Examples in Tables 1 to 3, and "back" means a layer shown at the most right of layer composition, in each of Examples and Comparative Examples in Tables 1 to 3.

Grade 5: No change in the surface of the nonwoven fabric

Grade 4: each one yarn stands and there is a little roughness at the surface, although there is no pilling in the surface of the nonwoven fabric Grade 3: There is pilling with a length of less than 0.5 cm, or scuffing floats as a whole.

Grade 2: There is pilling with a length of 1 cm or longer, or cotton-like substance floats at the friction face, or the friction face is worn out.

Grade 1: a part of the nonwoven fabric is broken

<Measurement Method for Initial Characteristics of a Capacitor>

(9) Winding Performance

Using a winding apparatus of a capacitor, 4 pieces of the anode foil, the separator, the cathode foil and the separator were wound around to judge whether normal winding was attained or not, according to the following standards A to D.

A: No problem at all
B: No problem by adjustment of winding condition
C: A defect product generates in the winding step even by adjustment of winding-around condition.
D: Many defect products generate.

(10) Electrostatic Capacitance

It was measured using an LCR meter under a measurement frequency of 120 Hz.

(11) Capacitance Occurrence Rate

As for elements after formation of the dielectric oxide film layer, practical electrostatic capacitance of the solid electrolytic capacitor prepared, relative to electrostatic capacitance measured in a 30% by mass aqueous solution of sulfuric acid was shown by percent (%).

(12) Tan δ

It was measured using the LCR meter under a measurement frequency of 120 Hz.

(13) Leakage Current

A protection resistor of 1000Ω was connected in series to a capacitor, and rated voltage was applied to measure leakage current after 5 minutes.

(14) ESR

It was measured using the LCR meter under a measurement frequency of 100 kHz.

(15) Short Circuit Rate (%)

After performing aging by continuously applying rated voltage for 1 hour (at atmosphere temperature of 105° C.), rate of a capacitor exhibiting a short circuit was shown by percent (%).

(16) Maximum Applied Voltage (V)

In accordance with JIS C-5101-1, 4-6, "a measurement method for withstand voltage", maximum applied voltage was measured under a direct current of 1.0 A.

(17) Heat Resistance in Soldering

As for a sample, after heating at a preheating temperature of 150° C. for 120 seconds and at a peak temperature of 240° C., measurements of the above items (10) to (14) were performed, as well as dimensional change and deformation of the external shape were observed to judge under the following criteria A to D. A: completely no problems, B: within rated level although a part of measurement values varies, C: a defect product generates partially, and D; many defect products generate.

Examples 1 to 11, 19, 22, 23, 25 and 27

Laminated nonwoven fabrics of Examples 1 to 11 were prepared by the following method to perform performance evaluation.

A nonwoven fabric layer (layer II) composed of a thermoplastic resin fiber was formed. Specifically, using a solution (using OCP as a solvent, and having a solution viscosity, $\eta sp/c=0.67$, measured at a temperature of 35° C.) of versatile PET (as a thermoplastic resin) (solution viscosity was measured using a viscosity tube in a constant temperature water tank at a temperature of 35° C. The same hereafter), a filament group was extruded toward a transferring collection net at a spinning temperature of 300° C., using a spunbond method, to perform spinning under a spinning speed of 4500 m/minute. Then, the filament group was sufficiently opened by charging about 3 μC/g in corona charging to form a web of the thermoplastic resin filament on the collection net. Adjustment of fiber diameter was performed by changing tracting condition.

Next, as an ultra fine fiber nonwoven fabric layer (layer I), an ultra fine fiber nonwoven fabric layer obtained by spinning by a melt blown method under condition of a spinning temperature of 300° C., and a flow rate of heated air of 1000 Nm$^3$/hr/m, using a solution of PET (using OCP as a solvent, and having a solution viscosity; $\eta sp/c=0.50$, measured at a temperature of 35° C.), was blown onto the above thermoplastic resin filament web. In this case, setting was as follows: distance from a melt blown nozzle to the thermoplastic resin filament web was 100 mm, suction force at a collection face just under a melt blown nozzle was 0.2 kPa, and air rate was 7 m/sec. By adjusting fiber diameter and crystallinity by changing the flow rate of heated air, a laminated web made by a nonwoven fabric layer (layer II) composed of thermoplastic resin filament, and a nonwoven fabric layer (layer I) composed of ultra fine fiber, was obtained.

Further, directly on the laminated web obtained in the above, the thermoplastic resin filament was laminated as the above nonwoven fabric layer (layer II), by a similar method as in formation of a thermoplastic resin filament web as the above nonwoven fabric layer (layer II), so as to attain predetermined fiber diameter and weight. In this way, a laminated layer web was obtained which was made of the nonwoven fabric layer (layer II) composed of thermoplastic resin filament/the nonwoven fabric layer (layer I) composed of ultra fine fiber/the nonwoven fabric layer (layer II) composed of thermoplastic resin filament. After heat adhesion of the obtained laminated web using a flat roll under condition shown in Tables 1 to 2, corona discharge processing (as hydrophilization processing) was performed to obtain the laminated nonwoven fabric by adjusting thickness so as to obtain predetermined thickness using a calender roll, as well as by adjusting apparent density. Various kinds of nonwoven fabric were obtained by changing processing condition under the above fundamental condition (Examples 1 to 11). Composition of the obtained laminated nonwoven fabric is shown in Tables 1 to 2, performance result of the laminated nonwoven fabric is shown in Tables 4 to 5.

A manufacturing method for a capacitor element and parts is as follows. The capacitor element was prepared by micro-slitting the above each laminated nonwoven fabric to 6 mm, and intervening these between the anode foil (aluminum foil) after chemical conversion coating and an aluminum foil, which will be the cathode foil, and then winding-around these. This capacitor element was subjected to re-chemical conversion coating using an aqueous solution of ammonium adipate. Next, after impregnating this capacitor element into a solution containing 3,4-ethylenedioxythiophene (1 part by mass) as a mononer, and iron (II) p-toluene sulfonate (2 parts by mass) as an oxidizing agent, and n-butanol (4 parts by mass) as a solvent, and pulling it up, polymerization was progressed by standing it still at 100° C. to form an electric conductive polymer of polyethylenedioxythiophene (as the solid electrolyte) between the electrode foils. Thus obtained element was coated with exterior resin at the outer circumference, and encapsulated into a packaging case made of an aluminum alloy with a sealing member of vulcanized butyl rubber, and then was sealed to prepare a solid electrolytic capacitor. Size of the obtained capacitor has a diameter of 8 mm and a longitudinal dimension of 10 mm, and two kinds of products were prepared (rated voltage; 25 V, rated electrostatic capacitance; 30 µF). Finally, aging was performed by continuously applying rated voltage for 1 hour (atmosphere temperature: 105° C.)

Initial characteristics of the solid electrolytic capacitor obtained by these procedures was measured. Results thereof are shown in Tables 7 and 8. It should be noted that in the tests of Examples and Comparative Examples shown in Tables 7 to 9, average value of 20 pieces of capacitors was adopted.

Examples 12, 13, 20, 21, 24 and 26

Similar conditions as in Examples 1 to 11 were used except that the laminated nonwoven fabric having a two layer structure (layer II and layer I) was used. Formation condition of the laminated nonwoven fabric and performance thereof are shown in Tables 1 to 2, and Tables 4 to 5, respectively. In addition, capacitor performance is shown in Tables 7 to 8.

Example 14

PPS (FORTRON, manufactured by Polyplastics Co., Ltd.) was used as a thermoplastic resin. Conditions for forming nonwoven fabric are as follows.

Layer II: melt viscosity of the resin: 70 g/10 minutes (measured using a capillary rheometer, measurement condition: load of 5 kg and temperature of 315.6° C.), spinning temperature: 320° C., and spinning speed: 8000 m/minute.

Layer I: melt viscosity of the resin: 670 g/10 minutes (measured by a similar method as above, measurement condition: load of 5 kg and temperature of 315.6° C.), spinning temperature: 340° C., heated air temperature: 390° C., and heated air amount: 1000 Nm³/hr/m.

In addition, thermal adhesion condition by a flat roll was set as follows; linear pressure: 260 N/cm, roll temperature: upper/down=170° C./170° C. Calendering condition was set as follows; linear pressure: 350 N/cm, roll temperature: upper/down=235° C./235° C. Formation condition of the laminated nonwoven fabric and performance thereof are shown in Tables 1 and 4, respectively. Other conditions were set as similar as in Example 1. In addition, capacitor performance is shown in Table 7.

Example 15

As a nonwoven fabric layer (layer II), staple fiber with a sheath/core structure made of co-Pet/PET, with a fiber diameter of 18 µm and a fiber length of 5 mm, was collected on a net by a sheet making method, so as to attain 30 g/m², and after dehydration drying, fibers themselves were fused by an air-through system (180° C., 5 m/minute) to obtain a staple fiber web. Next, as an intermediate layer thereon, similarly as in Example 1, melt blown fiber, which will be the nonwoven fabric layer (layer I), was blown and formed, and further as the nonwoven fabric layer (layer II) thereon, the nonwoven fabric with the same composition as that of the above nonwoven fabric layer (layer II) was overlapped. In this way, a laminated web composed of three layers was obtained. The obtained laminated web was thermally adhered using a flat roll and a calendar roll to obtain laminated nonwoven fabric. Formation condition of the laminated nonwoven fabric and performance thereof are shown in Tables 1 and Table 4, respectively. In addition, capacitor performance is shown in Table 7. It should be noted that melting point of staple fiber with a sheath-core structure in Table 1 is shown in the order of sheath/core (the same hereafter).

Example 16

PP (produced by Japan Polypropylene Corp.) was used as a thermoplastic resin. Conditions for forming nonwoven fabric are as follows.

Layer II: melt viscosity of the resin: 43 g/10 minutes (measured by a similar method as above, measurement condition: load of 2.1 kg, temperature of 230° C.), spinning temperature: 230° C., and spinning speed: 3300 m/minute.

Layer I: melt viscosity of the resin: 1500 g/10 minutes (measured by a similar method as above, measurement condition: load of 2.1 kg, temperature of 230° C.), spinning temperature: 295° C., heated air temperature: 320° C., heated air flow rate: 1050 Nm³/hr/m.

In addition, thermal adhesion condition by a flat roll was set as follows; linear pressure: 260 N/cm, roll temperature: upper/down=90° C./90° C. Calendering condition was set as follows; linear pressure: 350 N/cm, roll temperature: upper/down=120° C./120° C. Formation condition of the laminated nonwoven fabric and performance thereof are shown in Tables 1 and 4, respectively. In addition, capacitor performance is shown in Table 7.

Example 17

As the nonwoven fabric layer (layer II), staple fiber with a sheath/core structure made of co-Pet/PET, a fiber diameter of 16 µm and a fiber length of 5 mm, was collected on a net by a sheet making method, so as to attain 11 g/m², and after dehydration drying, fibers themselves were pressure bonded by a flat roll in a degree so as to prevent fiber from scattering to obtain a staple fiber web. Next, as an intermediate layer thereon, similarly as in Example 1, melt blown fiber, which will be the nonwoven fabric layer (layer I), was blown and formed, and further as the nonwoven fabric layer (layer II) thereon, a thermoplastic resin filament web with the same composition as that in Example 1 was laminated. The obtained laminated web was thermally adhered using a flat roll and a calendar roll to obtain laminated nonwoven fabric. Formation condition of the laminated nonwoven fabric and performance thereof are shown in Tables 1 and Table 4, respectively. In addition, capacitor performance is shown in Table 7.

Example 18

As the nonwoven fabric layer (layer II), staple fiber with a sheath/core structure made of co-Pet/PET, with a fiber diameter of 16 µm and a fiber length of 5 mm, was collected on a net by a sheet making method, so as to attain 11 g/m², and after dehydration drying, fibers themselves were pressure bonded by a flat roll in a degree so as to prevent fiber from scattering to obtain a staple fiber web. Next, as an intermediate layer thereon, similarly as in Example 1, melt blown fiber, which will be the nonwoven fabric layer (layer I), was blown and formed, and further as the nonwoven fabric layer (layer II) thereon, a staple fiber web with the same composition as that in Example 15 was laminated. The obtained laminated web was thermally adhered using a flat roll and a calendar roll to obtain laminated nonwoven fabric. Formation condition of the laminated nonwoven fabric and performance thereof are shown in Tables 1 and Table 4, respectively. In addition, capacitor performance is shown in Table 7.

Comparative Examples 1 and 2

Using similar PET as in Example 1, a filament group was extruded toward a transferring collection net at a spinning temperature of 300° C., by a spunbond method, to perform spinning under a spinning speed of 4500 m/minute. Then, the filament group was sufficiently opened by charging about 3 µC/g by corona charging to form a web of the thermoplastic resin filament on the collection net. Adjustment of fiber diameter was performed by changing extrusion amount. Then, after heat adhesion of the obtained web using a flat roll under condition shown in Table 3, corona discharge processing was performed to obtain nonwoven fabric composed on only the nonwoven fabric layer (layer II) by adjusting thickness so as to obtain predetermined thickness using a calender roll, as well as by adjusting apparent density. Composition of the obtained nonwoven fabric and performance result thereof are shown in Table 3 and Table 6, respectively.

In addition, capacitor performance is shown in Table 9.

Comparative Example 3

Using spunbond nonwoven fabric (E05025 with a fiber diameter of 16 µm and a weight of 25 g/m²), produced by Asahi Kasei Fibers Corp., as nonwoven fabric, it was made as an example of nonwoven fabric composed of only the nonwoven fabric layer (layer II). Composition of the nonwoven fabric and performance result thereof are shown in Table 3 and Table 6, respectively. In addition, capacitor performance is shown in Table 9.

Comparative Example 4

Using a similar resin as in layer I of Example 1, an ultra fine fiber nonwoven fabric layer was formed by spinning by a melt blown method under condition of a spinning temperature of 300° C., and a flow rate of heated air of 1000 Nm³/hr/m. Setting in this case was as follows: distance from a melt blown nozzle to the web was 100 mm, suction force at a collection face just under a melt blown nozzle was 0.2 kPa; and air rate was 7 m/sec. By adjusting fiber diameter and crystallinity by changing discharge rate, nonwoven fabric layer composed of only an ultra fine fiber nonwoven fabric layer (layer I) was obtained. Composition of the nonwoven fabric and performance result thereof are shown in Table 3 and Table 6, respectively. In addition, capacitor performance is shown in Table 9.

Comparative Example 5

Nonwoven fabric was obtained which was composed of only ultra fine fiber nonwoven fabric layer (layer I) having an average fiber diameter of 0.7 µm, obtained by a similar method as in Comparative Example 4. Composition of the nonwoven fabric and performance result thereof are shown in Table 3 and Table 6, respectively. In addition, capacitor performance is shown in Table 9.

Comparative Example 6

PET staple fiber with a fiber diameter of 16 µm and a fiber length of 5 mm was collected on a net by a sheet making method, so as to attain 25 g/m². It should be noted that, in this case, polyvinyl alcohol (a dissolution temperature of 70° C.) was used as a binder, so as to prevent fibers themselves from scattering and also to maintain strength of the nonwoven fabric, and weight of the whole was set at 33 g/m². After dehydration drying of this web, it was pressure bonded using a calender roll to obtain nonwoven fabric composed of only the nonwoven fabric layer (layer II). Composition of the obtained nonwoven fabric and performance result thereof are shown in Table 3 and Table 6, respectively. In addition, capacitor performance is shown in Table 9.

Comparative Example 7

PET staple fiber with a fiber diameter of 10 µm and a fiber length of 5 mm was collected on a net by a sheet making method, so as to attain 25 g/m². It should be noted that, in this case, polyvinyl alcohol (a dissolution temperature of 70° C.) was used as a binder, so as to prevent fibers themselves from scattering and also to maintain strength of the nonwoven fabric, and weight of the whole was set at 33 g/m². After dehydration drying of this web, it was pressure bonded using a calender roll to obtain nonwoven fabric composed of only the nonwoven fabric layer (layer II). Composition of the obtained nonwoven fabric and performance result thereof are shown in Table 3 and Table 6, respectively. In addition, capacitor performance is shown in Table 9.

Comparative Example 8

A capacitor was obtained using similar nonwoven fabric as in Comparative Example 6, by a similar step as in Comparative Example 6, except that a removal step of a binder was strengthened (a step of immersing in a hot water bath at 90° C. for 10 minutes, and a step of drying at 100° C. for 5 minutes after that were repeated three times), in a formation step of the capacitor.

Capacitor performance is shown in Table 9.

Comparative Example 9

A capacitor was obtained using similar nonwoven fabric as in Comparative Example 7, by a similar step as in Comparative Example 7, except that a removal step of a binder was strengthened (a step of immersing in a hot water bath at 90° C. for 10 minutes, and a step of drying at 100° C. for 5 minutes after that were repeated three times), in a formation step of the capacitor.

Capacitor performance is shown in Table 9.

Comparative Example 10

Wet-type nonwoven fabric (RCE3040, having a fiber diameter of 8 m, and a weight of 40 g/m$^2$), composed of rayon fiber, produced by Nippon Kodoshi Corp., was used, as nonwoven fabric. Composition of the nonwoven fabric is shown in Table 3, and performance result thereof is shown in Table 6. In addition, capacitor performance is shown in Table 9.

The above results are shown in Tables 1 to 9.

TABLE 1

| | | | | | | Specification | | | | |
| | | layer II | | | | layer I | | | | |
| | | | | | | | | Mass ratio based | | |
| Unit | Fiber type | Fiber diameter μm | Weight g/m$^2$ | Melting poit ° C. | Fiber type | Fiber diameter μm | Weight g/m$^2$ | on total weight of nonwoven fabric % | Solution viscosity | Melting poit ° C. |
| Example 1 | PET SB | 16 | 11.0 | 260 | PET MB | 1.6 | 3.0 | 12.0 | 0.5 | 260 |
| Example 2 | PET SB | 16 | 8.8 | 260 | PET MB | 1.6 | 2.4 | 12.0 | 0.5 | 260 |
| Example 3 | PET SB | 16 | 13.2 | 260 | PET MB | 1.6 | 3.6 | 12.0 | 0.5 | 260 |
| Example 4 | PET SB | 16 | 10.4 | 260 | PET MB | 1.6 | 4.2 | 16.8 | 0.5 | 260 |
| Example 5 | PET SB | 16 | 11.3 | 260 | PET MB | 1.6 | 2.5 | 10.0 | 0.5 | 260 |
| Example 6 | PET SB | 16 | 11.0 | 260 | PET MB | 1.6 | 3.0 | 12.0 | 0.5 | 260 |
| Example 7 | PET SB | 16 | 8.8 | 260 | PET MB | 1.6 | 2.4 | 12.0 | 0.5 | 260 |
| Example 8 | PET SB | 8 | 11.0 | 260 | PET MB | 1.6 | 3.0 | 12.0 | 0.5 | 260 |
| Example 9 | PET SB | 25 | 11.0 | 260 | PET MB | 1.6 | 3.0 | 12.0 | 0.5 | 260 |
| Example 10 | PET SB | 16 | 11.0 | 260 | PET MB | 0.7 | 3.0 | 12.0 | 0.5 | 260 |
| Example 11 | PET SB | 16 | 11.0 | 260 | PET MB | 3.5 | 3.0 | 12.0 | 0.5 | 260 |
| Example 12 | PET SB | 16 | 22.0 | 260 | PET MB | 1.6 | 3.0 | 12.0 | 0.5 | 260 |
| Example 13 | PET SB | 16 | 22.5 | 260 | PET MB | 1.6 | 2.5 | 10.0 | 0.5 | 260 |
| Example 14 | PPS SB | 16 | 11.0 | 285 | PPS MB | 1.6 | 3.0 | 12.0 | — | 285 |
| Example 15 | co-PET/ PET | 16 | 11.0 | 160/260 | PET MB | 1.6 | 3.0 | 12.0 | 0.45 | 260 |
| Example 16 | PP SB | 12 | 11.0 | 160 | PET MB | 1.6 | 3.0 | 12.0 | 0.4 | 260 |
| Example 17 | co-PET/ PET | 16 | 11.0 | 160/260 | PET MB | 1.6 | 3.0 | 12.0 | 0.5 | 260 |
| Example 18 | co-PET/ PET | 16 | 11.0 | 160/260 | PET MB | 1.6 | 3.0 | 12.0 | 0.5 | 260 |

| | | | | | Specification | | | |
| | | | | | | | Flat roll bonding condition Upper: Coating face/ Lower: Non-coating face | | Calendering condition Upper: Coating face/ Lower: Non-coating face | |
| | | layer II | | | | | | |
| Unit | Fiber type | Fiber diameter μm | Weight g/m$^2$ | Melting poit ° C. | Pressure N/cm | Temperature (Upper/Lower) ° C. | Pressure N/cm | Temperature (Upper/Lower) ° C. |
| Example 1 | PET SB | 16 | 11.0 | 260 | 260 | 145/145 | 350 | 210/210 |
| Example 2 | PET SB | 16 | 8.8 | 260 | 260 | 140/140 | 350 | 210/210 |
| Example 3 | PET SB | 16 | 13.2 | 260 | 260 | 150/150 | 350 | 220/220 |

TABLE 1-continued

| | | Fiber diameter | Weight | | | | |
|---|---|---|---|---|---|---|---|
| Example 4 | PET SB | 16 | 10.4 | 260 | 260 | 145/145 | 350 | 205/205 |
| Example 5 | PET SB | 16 | 11.2 | 260 | 260 | 145/145 | 350 | 210/210 |
| Example 6 | PET SB | 16 | 11 | 260 | 260 | 140/140 | 340 | 200/200 |
| Example 7 | PET SB | 16 | 8.8 | 260 | 260 | 140/140 | 330 | 190/190 |
| Example 8 | PET SB | 8 | 11 | 260 | 260 | 140/140 | 340 | 210/210 |
| Example 9 | PET SB | 25 | 11 | 260 | 260 | 150/150 | 360 | 220/220 |
| Example 10 | PET SB | 16 | 11 | 260 | 260 | 140/140 | 350 | 210/210 |
| Example 11 | PET SB | 16 | 11 | 260 | 260 | 140/140 | 350 | 210/210 |
| Example 12 | None | — | — | — | 260 | 50/140 | 350 | 50/190 |
| Example 13 | None | — | — | — | 260 | 50/140 | 350 | 50/190 |
| Example 14 | PPS SB | 16 | 11 | 285 | 260 | 170/170 | 350 | 235/235 |
| Example 15 | co-PET/PET | 16 | 11 | 160/260 | 260 | 120/120 | 250 | 120/120 |
| Example 16 | PP SB | 12 | 11 | 260 | 260 | 90/90 | 350 | 120/120 |
| Example 17 | PET SB | 16 | 11 | 260 | 260 | 140/140 | 340 | 200/200 |
| Example 18 | co-PET/PET | 16 | 11 | 160/260 | 260 | 140/140 | 340 | 200/200 |

TABLE 2

| | Specification | | | | | | | | |
|---|---|---|---|---|---|---|---|---|---|
| | layer II | | | layer I | | | | | |
| | | | | | | | Mass ratio based on total weight of nonwoven fabric % | | |
| Unit | Fiber type | Fiber diameter μm | Weight g/m² | Melting poit °C. | Fiber type | Fiber diameter μm | Weight g/m² | Solution viscosity | Melting poit °C. |
| Example 19 | PET SB | 16 | 9.0 | 260 | PET MB | 0.3 | 2.0 | 10.0 | 0.5 | 260 |
| Example 20 | PET SB | 12 | 10.0 | 260 | PET MB | 1.5 | 5.0 | 33.3 | 0.5 | 260 |
| Example 21 | PET SB | 9 | 5.0 | 260 | PET MB | 0.5 | 5.0 | 50.0 | 0.5 | 260 |
| Example 22 | PET SB | 20 | 16.7 | 260 | PET MB | 1.6 | 6.6 | 16.5 | 0.5 | 260 |
| Example 23 | PET SB | 8 | 3.0 | 260 | PET MB | 1.6 | 1.0 | 14.3 | 0.5 | 260 |
| Example 24 | PET SB | 12 | 10.0 | 260 | PET MB | 1.6 | 10.0 | 50.0 | 0.5 | 260 |
| Example 25 | PET SB | 12 | 5.0 | 260 | PET MB | 1.6 | 10.0 | 50 | 0.5 | 260 |
| Example 26 | PET SB | 12 | 6.7 | 260 | PET MB | 3 | 13.3 | 66.7 | 0.5 | 260 |
| Example 27 | PET SB | 9 | 5.0 | 260 | PET MB | 1.6 | 5.0 | 25.0 | 0.5 | 260 |

| | Specification | | | | | |
|---|---|---|---|---|---|---|
| | layer II | | | Flat roll bonding condition Upper: Coating face/ Lower: Non-coating face | | Calendering condition Upper:Coating face/ Lower: Non-coating face | |
| Unit | Fiber type | Fiber diameter μm | Weight g/m² | Melting poit °C. | Pressure N/cm | Temperature (Upper/Lower) °C. | Pressure N/cm | Temperature (Upper/Lower) °C. |
| Example 19 | PET SB | 16 | 9.0 | 260 | 260 | 140/140 | 350 | 210/210 |
| Example 20 | None | — | — | — | 260 | 50/140 | 350 | 50/190 |
| Example 21 | None | — | — | — | 260 | 50/140 | 350 | 50/190 |
| Example 22 | PET SB | 20 | 16.7 | 260 | 260 | 150/150 | 350 | 230/230 |

TABLE 2-continued

| | | | | | | | | |
|---|---|---|---|---|---|---|---|---|
| Example 23 | PET SB | 8 | 3.0 | 260 | 260 | 130/130 | 350 | 190/190 |
| Example 24 | None | — | — | — | 260 | 50/140 | 350 | 50/190 |
| Example 25 | PET SB | 12 | 5.0 | 260 | 260 | 140/140 | 350 | 200/200 |
| Example 26 | None | — | — | — | 260 | 50/140 | 350 | 50/190 |
| Example 27 | PET SB | 12 | 10.0 | 260 | 260 | 140/140 | 350 | 200/200 |

TABLE 3

| | Specification | | | | | | | |
|---|---|---|---|---|---|---|---|---|
| | layer II | | | layer I | | | | |
| | | | | | | | Mass ratio based | |
| Unit | Fiber type | Fiber diameter μm | Weight g/m² | Melting poit °C. | Fiber type | Fiber diameter μm | Weight g/m² | on total weight of nonwoven fabric % | Solution viscosity | Melting poit °C. |
| Comparative Example 1 | PET SB | 16 | 25.0 | 260 | — | — | — | — | — | — |
| Comparative Example 2 | PET SB | 16 | 30.0 | 260 | — | — | — | — | — | — |
| Comparative Example 3 | PET SB | 16 | 25.0 | 260 | — | — | — | — | — | — |
| Comparative Example 4 | — | — | — | — | PET MB | 1.6 | 25.0 | 100 | 0.5 | 260 |
| Comparative Example 5 | — | — | — | — | PET MB | 0.7 | 25.0 | 100 | 0.5 | 260 |
| Comparative Exampl 6 | PET | 16 | 25 | 260 | — | — | — | — | — | — |
| Comparative Exampl 7 | PET | 10 | 25 | 260 | — | — | — | — | — | — |
| Comparative Exampl 8 | PET | 16 | 25 | 260 | — | — | — | — | — | — |
| Comparative Exampl 9 | PET | 10 | 25 | 260 | — | — | — | — | — | — |
| Comparative Exampl 10 | — | 8 | 40 | — | — | — | — | — | — | — |

| | Specification | | | | Flat roll bonding condition Upper: Coating face/ Lower: Non-coating face | | Calendering condition Upper: Coating face/ Lower: Non-coating face | |
|---|---|---|---|---|---|---|---|---|
| | layer II | | | | | | | |
| Unit | Fiber type | Fiber diameter μm | Weight g/m² | Melting poit °C. | Pressure N/cm | Temperature (Upper/Lower) °C. | Pressure °C. | Temperature (Upper/Lower) °C. |
| Comparative Example 1 | — | — | — | — | 260 | 190/190 | 380 | 245/245 |
| Comparative Example 2 | — | — | — | — | 260 | 190/190 | 380 | 250/250 |
| Comparative Example 3 | — | — | — | — | — | — | — | — |
| Comparative Example 4 | — | — | — | — | 260 | 120/120 | 340 | 40/40 |
| Comparative Example 5 | — | — | — | — | — | — | 340 | 40/40 |
| Comparative Exampl 6 | — | — | — | — | — | — | 250 | 120/120 |
| Comparative Exampl 7 | — | — | — | — | — | — | 250 | 120/120 |
| Comparative Exampl 8 | — | — | — | — | — | — | 250 | 120/120 |
| Comparative Exampl 9 | — | — | — | — | — | — | 250 | 120/120 |
| Comparative Exampl 10 | — | — | — | — | — | — | — | — |

TABLE 4

| Unit | Weight g/m² | Thickness μm | Apparent density g/cm³ | Tensile strength N/30 mm | Average pore size μm | Surface wearability Surface/back Grade |
|---|---|---|---|---|---|---|
| Example 1 | 26.3 | 37.0 | 0.71 | 81 | 9.0 | 3/3 |
| Example 2 | 20.4 | 30.4 | 0.67 | 66 | 10.2 | 3/3 |
| Example 3 | 30.8 | 42.1 | 0.73 | 93 | 8.1 | 3/3 |
| Example 4 | 26.2 | 38.4 | 0.68 | 72 | 7.9 | 3/3 |
| Example 5 | 25.9 | 36.7 | 0.71 | 59 | 12.1 | 3/3 |
| Example 6 | 26.3 | 43.1 | 0.61 | 75 | 10.6 | 3/3 |
| Example 7 | 20.4 | 34.5 | 0.59 | 62 | 12.3 | 3/3 |
| Example 8 | 26.1 | 37.4 | 0.72 | 96 | 8.8 | 3/3 |
| Example 9 | 26.1 | 39.1 | 0.67 | 52 | 12.0 | 3/3 |
| Example 10 | 26.2 | 37.3 | 0.7 | 89 | 7.5 | 3/3 |
| Example 11 | 26.2 | 38.4 | 0.68 | 75 | 11.5 | 3/3 |
| Example 12 | 26.0 | 38.4 | 0.68 | 77 | 8.2 | 3/1 |
| Example 13 | 26.1 | 37.0 | 0.71 | 72 | 9.5 | 3/1 |
| Example 14 | 26.4 | 37.3 | 0.71 | 61 | 9.1 | 3/3 |
| Example 15 | 26.3 | 40.2 | 0.65 | 25 | 15.3 | 3/3 |
| Example 16 | 25.1 | 40.1 | 0.63 | 32 | 16.7 | 2/2 |
| Example 17 | 25.5 | 35.1 | 0.73 | 55 | 13.3 | 2/3 |
| Example 18 | 25.3 | 38.6 | 0.66 | 35 | 14.5 | 2/3 |

TABLE 5

| Unit | Weight g/m² | Thickness μm | Apparent density g/cm³ | Tensile strength N/30 mm | Average pore size μm | Surface wearability Surface/back Grade |
|---|---|---|---|---|---|---|
| Example 19 | 20.2 | 32.3 | 0.63 | 70 | 6.0 | 3/3 |
| Example 20 | 15.6 | 28.1 | 0.56 | 31 | 7.5 | 3/1 |
| Example 21 | 10.2 | 23.4 | 0.44 | 19 | 4.3 | 3/1 |
| Example 22 | 39.7 | 60.1 | 0.66 | 125 | 5.0 | 3/3 |
| Example 23 | 7.1 | 10.6 | 0.67 | 17 | 18 | 3/3 |
| Example 24 | 20.1 | 49.5 | 0.41 | 25 | 6.0 | 3/1 |
| Example 25 | 20.8 | 29.8 | 0.7 | 68 | 3.8 | 3/3 |
| Example 26 | 20.3 | 46.3 | 0.44 | 22 | 8.1 | 3/1 |
| Example 27 | 20.6 | 31.4 | 0.66 | 65 | 7.2 | 3/2 |

TABLE 6

| Unit | Total weight g/m² | Thickness μm | Apparent density g/cm³ | Tensile strength N/30 mm | Average pore size μm | Surface wearability Surface/back Grade |
|---|---|---|---|---|---|---|
| Comparative Example 1 | 24.8 | 42.0 | 0.59 | 78 | 35.3 | 3/3 |
| Comparative Example 2 | 29.8 | 51.1 | 0.58 | 99 | 32.0 | 3/3 |
| Comparative Example 3 | 25.2 | 112 | 0.23 | 56 | 40.2 | 3/3 |
| Comparative Example 4 | 25.2 | 38.0 | 0.66 | 5 | 5.2 | 1/1 |
| Comparative Example 5 | 25.1 | 43.2 | 0.58 | 4 | 2.8 | 1/1 |
| Comparative Example 6 | 25.3 | 42.3 | 0.60 | 32 | 40.1 | 2/2 |
| Comparative Example 7 | 25.3 | 38.5 | 0.66 | 28 | 32.1 | 2/2 |
| Comparative Example 8 | 25.3 | 42.3 | 0.60 | 32 | 40.1 | 2/2 |
| Comparative Example 9 | 25.3 | 38.5 | 0.66 | 28 | 32.1 | 2/2 |
| Comparative Example 10 | 12.6 | 43.0 | 0.29 | 36 | — | 2/2 |

TABLE 7

| Unit | Winding property Jugement | Specification Electrostatic capacitance μF | Capacitance occurrence rate % | tan δ | ESR mΩ | Leakage current μA | Rate of short circuit % | Maximam applied voltage V | Heat resistance in soldering Jugement |
|---|---|---|---|---|---|---|---|---|---|
| Example 1 | A | 29.1 | 97 | 0.039 | 15.1 | 28 | 0 | 27.5 | A |
| Example 2 | A | 29.3 | 98 | 0.031 | 14.8 | 33 | 0 | 27.8 | A |
| Example 3 | A | 28.8 | 96 | 0.041 | 20.1 | 42 | 0 | 28.5 | A |
| Example 4 | A | 29.0 | 97 | 0.039 | 15.3 | 29 | 0 | 27.1 | A |
| Example 5 | A | 29.2 | 97 | 0.035 | 14.9 | 35 | 0 | 27.1 | A |
| Example 6 | A | 29.4 | 98 | 0.033 | 13.9 | 53 | 0 | 27.4 | A |
| Example 7 | A | 29.4 | 98 | 0.03 | 13.7 | 50 | 0 | 27.5 | A |
| Example 8 | A | 29.1 | 97 | 0.047 | 15.3 | 43 | 0 | 25.9 | A |
| Example 9 | A | 29.2 | 97 | 0.036 | 14.9 | 62 | 0 | 26.1 | A |
| Example 10 | A | 29.4 | 96 | 0.038 | 14.8 | 35 | 0 | 28.5 | A |
| Example 11 | A | 29.1 | 97 | 0.035 | 15.0 | 37 | 0 | 26.6 | A |
| Example 12 | B | 28.7 | 96 | 0.047 | 15.7 | 52 | 5 | 26.9 | A |
| Example 13 | B | 28.9 | 96 | 0.041 | 15.5 | 59 | 5 | 27.0 | A |
| Example 14 | A | 28.9 | 96 | 0.039 | 15.2 | 48 | 0 | 26.5 | A |
| Example 15 | B | 29.0 | 97 | 0.035 | 14.9 | 50 | 5 | 26.2 | B |
| Example 16 | A | 27.7 | 92 | 0.031 | 15.2 | 95 | 10 | 23.8 | C |
| Example 17 | A | 29.1 | 97 | 0.042 | 15 | 62 | 5 | 26.8 | A |
| Example 18 | A | 28.7 | 96 | 0.037 | 15.1 | 85 | 10 | 25.1 | A |

TABLE 8

| Unit | Winding property Jugement | Specification Electrostatic capacitance μF | Capacitance occurrence rate % | tan δ | ESR mΩ | Leakage current μA | Rate of short circuit % | Maximam applied voltage V | Heat resistance in soldering Jugement |
|---|---|---|---|---|---|---|---|---|---|
| Example 19 | A | 29.2 | 99 | 0.031 | 14.7 | 30 | 0 | 28.9 | A |
| Example 20 | B | 28.9 | 98 | 0.03 | 13.8 | 33 | 0 | 28.3 | A |
| Example 21 | B | 28.5 | 96 | 0.037 | 14.7 | 27 | 0 | 23.8 | A |
| Example 22 | A | 26.0 | 99 | 0.05 | 25.4 | 29 | 0 | 31.0 | A |
| Example 23 | B | 27.1 | 90 | 0.033 | 16.2 | 97 | 10 | 23.5 | A |
| Example 24 | B | 28.3 | 98 | 0.055 | 23.0 | 31 | 0 | 30.1 | A |
| Example 25 | A | 28.8 | 96 | 0.03 | 14.6 | 32 | 0 | 28.7 | A |
| Example 26 | B | 28.9 | 98 | 0.033 | 14.2 | 44 | 0 | 29.4 | A |
| Example 27 | A | 28.5 | 98 | 0.03 | 14.7 | 31 | 0 | 27.5 | A |

TABLE 9

| Unit | Winding property Jugement | Specification Electrostatic capacitance μF | Capacitance occurrence rate % | tan δ | ESR mΩ | Leakage current μA | Rate of short circuit % | Maximam applied voltage V | Heat resistance in soldering Jugement |
|---|---|---|---|---|---|---|---|---|---|
| Comparative Example 1 | A | 26.5 | 88 | 0.098 | 20.2 | 212 | 40 | 24.7 | A |
| Comparative Example 2 | A | 26.2 | 87 | 0.15 | 25.2 | 313 | 35 | 23.9 | A |
| Comparative Example 3 | A | 23.5 | 78 | 3.57 | 36.1 | 376 | 85 | 21.8 | A |
| Comparative Example 4 | D | 26.6 | 89 | 0.087 | 16.1 | 78 | 15 | 22.3 | B |
| Comparative Example 5 | D | 26.2 | 87 | 0.096 | 19.6 | 97 | 35 | 20.6 | B |
| Comparative Example 6 | B | 28.9 | 96 | 0.065 | 15.4 | 1340 | 75 | 22.5 | C |
| Comparative Example 7 | B | 28.8 | 96 | 0.059 | 15.1 | 1760 | 85 | 21.6 | C |
| Comparative Example 8 | B | 29.1 | 97 | 0.037 | 15.2 | 356 | 65 | 23.9 | B |
| Comparative Example 9 | B | 28.6 | 95 | 0.046 | 14.9 | 2570 | 55 | 23.3 | B |
| Comparative Example 10 | A | 29.1 | 97 | 4.59 | 13.8 | 12560 | 100 | 24.3 | C |

It should be noted that, in Tables 1 to 9, PET represents polyethylene terephthalate, MB represents a melt blown web, SB represents a spunbond web, and SL represents a spun lace web.

As is clear from Tables 7 to 9, the solid electrolytic capacitor relevant to the present invention shows superior performance at least either of items of capacitor performances, as compared with those of Comparative Examples.

Industrial Applicability

The solid electrolytic capacitor of the present invention is utilized suitably in the field of various kinds of electronic equipment.

DESCRIPTION OF REFERENCE NUMERALS

1 Separator
2 Anode foil
3 Cathode foil
4 Lead wire
5 Lead wire
10 Capacitor element

The invention claimed is:

1. A separator for a solid electrolytic capacitor comprising a solid electrolyte and a nonwoven fabric holding said solid electrolyte, wherein
said nonwoven fabric is a laminated nonwoven fabric having at least two layers of nonwoven fabric layers,
said laminated nonwoven fabric comprising a nonwoven fabric layer (layer I) composed of ultra fine fiber having a fiber diameter of 0.1 to 4 μm, and a nonwoven fabric layer (layer II) composed of thermoplastic resin fiber having a fiber diameter of 6 to 30 μm,
said laminated nonwoven fabric has a thickness of 15 to 80 μm, a weight of 7 to 50 g/m$^2$, an apparent density of 0.2 to 0.8 g/cm$^3$ and average pore size of 0.3 to 20 μm,
said nonwoven fabric layer (layer I) has a weight of 1.5 to 13.3 g/m$^2$, and
said thermoplastic resin fiber in the nonwoven fabric layer (layer II) comprises a crystalline resin having a melting point of 180° C. or higher.

2. The separator according to claim 1, wherein
said laminated nonwoven fabric is composed of two layers of said nonwoven fabric layers (layer II) and said nonwoven fabric layer (layer I) present as an intermediate layer between said nonwoven fabric layers (layer II);
fiber diameter of said ultra fine fiber in said nonwoven fabric layer (layer I) being 0.1 to 4 μm; and
fiber diameter of said thermoplastic resin fiber in said nonwoven fabric layer (layer II) being 6 to 30 μm.

3. The separator according to claim 1 or 2, wherein said thermoplastic resin fiber in said nonwoven fabric layer (layer II) is a thermoplastic synthetic filament.

4. The separator according to claim 1 or 2, wherein said laminated nonwoven fabric is formed by integration by thermal bonding.

5. The separator according to claim 1 or 2, wherein said thermoplastic resin fiber in said nonwoven fabric layer (layer II) is a fiber of a crystalline resin having a melting point of 180° C. or higher.

6. The separator according to claim 1 or 2, wherein said nonwoven fabric layer (layer I) is formed by a melt blown method.

7. The separator according to claim 1 or 2, wherein ratio of weight (i) of said nonwoven fabric layer (layer I) to weight (ii) of said nonwoven fabric layer (layer II) in said laminated nonwoven fabric, (i)/(ii), is 1/10 to 2/1.

8. The separator according to claim 1 or 2, wherein said laminated nonwoven fabric has been subjected to calendering.

9. The separator according to claim 1 or 2, wherein said laminated nonwoven fabric has been subjected to hydrophilization processing.

10. A solid electrolytic capacitor comprising an anode foil and a cathode foil, and a separator according to claim 1 or 2, arranged between said anode foil and said cathode foil, wherein
said anode foil, said cathode foil, and said separator are wound, so that said separator is intervened between said anode foil and said cathode foil; and
said anode foil has as a dielectric oxide film layer.

11. The separator according to claim 1 or 2, wherein said nonwoven fabric layer (layer I) has a weight of 1.5 to 10 g/m$^2$.

12. The separator according to claim 1 or 2, wherein said laminated nonwoven fabric has a weight of 7 to 40 g/m$^2$.

* * * * *